(12) United States Patent
Suzuki et al.

(10) Patent No.: US 11,375,101 B2
(45) Date of Patent: Jun. 28, 2022

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventors: Ryuta Suzuki, Yokohama (JP); Tomokuni Hirosawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 17/061,491

(22) Filed: Oct. 1, 2020

(65) Prior Publication Data

US 2021/0105413 A1 Apr. 8, 2021

(30) Foreign Application Priority Data

Oct. 3, 2019 (JP) .............................. JP2019-183281
Jul. 7, 2020 (JP) .............................. JP2020-117326

(51) Int. Cl.
*H04N 5/225* (2006.01)
*H04N 5/232* (2006.01)
*G06T 7/00* (2017.01)

(52) U.S. Cl.
CPC ..... *H04N 5/232123* (2018.08); *G06T 7/0002* (2013.01); *G06T 2207/10148* (2013.01); *G06T 2207/20021* (2013.01); *G06T 2207/20224* (2013.01)

(58) Field of Classification Search
CPC ........... H04N 5/232123; H04N 5/2256; H04N 5/232122; H04N 5/23245; H04N 5/2351; H04N 5/2353; H04N 5/2354; H04N 5/35554; H04N 5/232127; G06T 7/0002; G06T 2207/10148; G06T 2207/20021; G06T 2207/20224
USPC ...................................................... 348/207.99
See application file for complete search history.

(56) References Cited

U.S. PATENT DOCUMENTS

2015/0281617 A1* 10/2015 Ichimiya .......... H04N 5/232127
348/322
2018/0234619 A1* 8/2018 Hirosawa ............... G03B 13/36

FOREIGN PATENT DOCUMENTS

JP 10-104502 A 4/1998

* cited by examiner

*Primary Examiner* — Stephen P Coleman
(74) *Attorney, Agent, or Firm* — Cowan, Liebowitz & Latman, P.C.

(57) ABSTRACT

An image capturing apparatus capable of focus detection includes a sensor including a plurality of pixels, the sensor being capable of changing an accumulation time of the pixels for each of a plurality of regions including the plurality of pixels, an accumulation control unit that, in accordance with a state or a setting of the image capturing apparatus, changes accumulation control of the pixels for each of the plurality of regions, and a defocus computation unit that calculates a defocus amount using signals from the pixels for which accumulation has been controlled by the accumulation control unit.

26 Claims, 21 Drawing Sheets

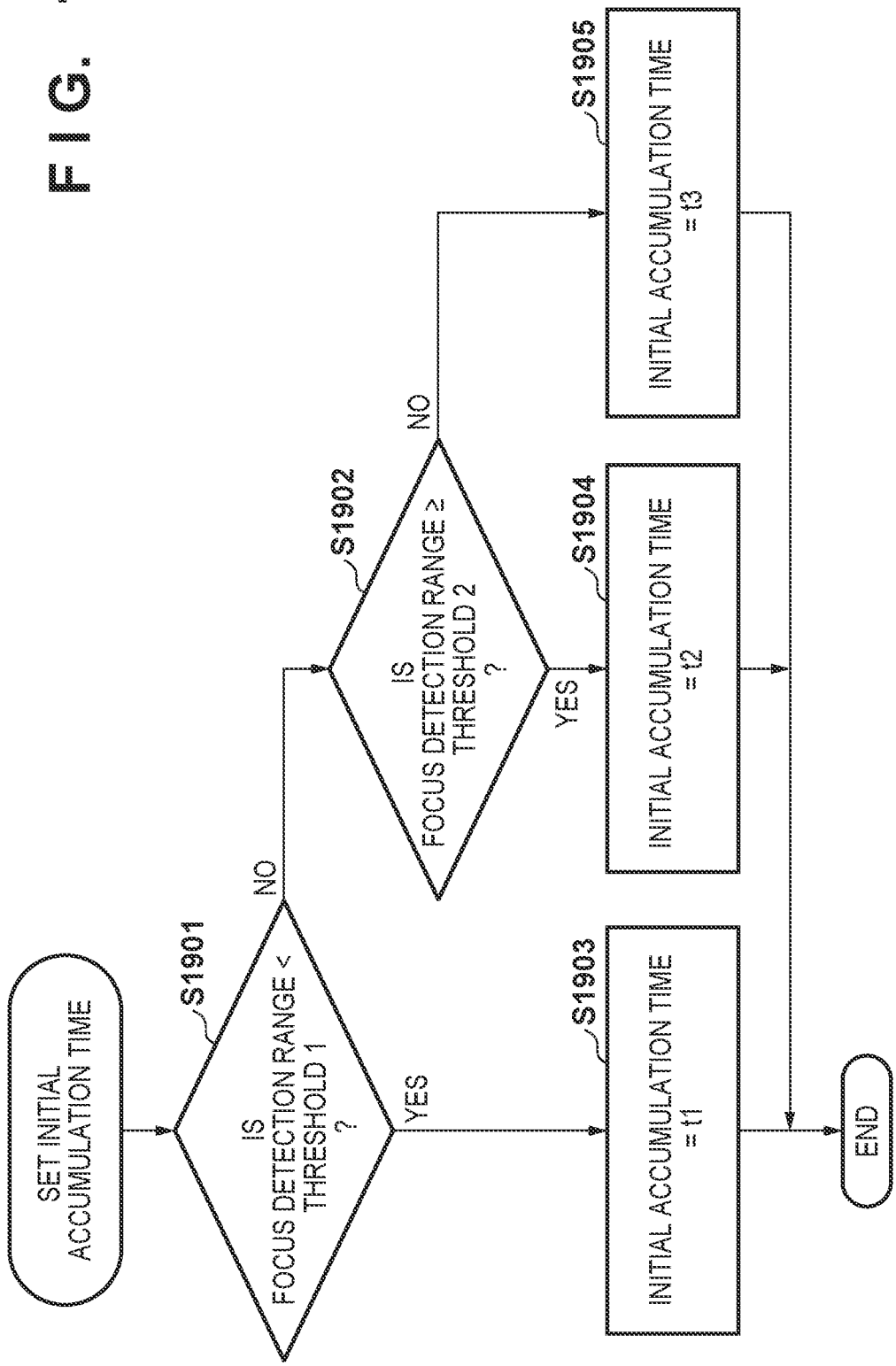

IMAGE CAPTURING APPARATUS, CONTROL METHOD THEREOF, AND STORAGE MEDIUM

BACKGROUND OF THE INVENTION

Field of the Invention

The present invention relates to focus detection techniques in an image capturing apparatus.

Description of the Related Art

A method in which focus detection pixels are disposed in an image sensor and focus detection is performed using a pupil-division phase difference method is known as a past focus detection method for an image capturing apparatus. A CMOS-type image sensor having a configuration that enables global electronic shutter operations is known as well.

Additionally, a method for detecting focus by changing the direction of defocus computations in a single focus detection region is known as a focus detection method for an image capturing apparatus. It is also known that the stated direction is one direction or a plurality of directions, depending on the focus detection region.

As a method for controlling accumulation in an image sensor, Japanese Patent Laid-Open No. 10-104502 discloses a method of dividing the image sensor into a plurality of regions and controlling the accumulation time for each of the post-division regions.

However, if the same accumulation control is always performed for each of the regions into which the image sensor has been divided, it may not be possible to obtain a desired signal level, depending on conditions such as the position of the region in which the focus detection is performed, a computation range, whether or not a subject is present, and the like.

SUMMARY OF THE INVENTION

Having been achieved in view of the above-described problem, the present invention makes it possible to control accumulation in a sensor for focus detection appropriately in an image capturing apparatus.

According to a first aspect of the present invention, there is provided an image capturing apparatus capable of focus detection, the apparatus comprising: a sensor including a plurality of pixels, the sensor being capable of changing an accumulation time of the pixels for each of a plurality of regions including the plurality of pixels; and at least one processor or circuit configured to function as: an accumulation control unit that, in accordance with a state or a setting of the image capturing apparatus, changes accumulation control of the pixels for each of the plurality of regions; and a defocus computation unit that calculates a defocus amount using signals from the pixels for which accumulation has been controlled by the accumulation control unit.

According to a second aspect of the present invention, there is provided a method of controlling an image capturing apparatus, the image capturing apparatus comprising a sensor that includes a plurality of pixels and that can change an accumulation time of the pixels for each of a plurality of regions including the plurality of pixels, and the method comprising: changing, in accordance with a state or a setting of the image capturing apparatus, accumulation control of the pixels for each of the plurality of regions; and calculating a defocus amount using signals from the pixels for which accumulation has been controlled in the accumulation control.

Further features of the present invention will become apparent from the following description of exemplary embodiments with reference to e attached drawings.

BRIEF DESCRIPTION OF THE DRAWINGS

FIG. 19 is a flowchart illustrating operations for determining an initial accumulation time according to a fifth embodiment.

DESCRIPTION OF THE EMBODIMENTS

Figure 1:
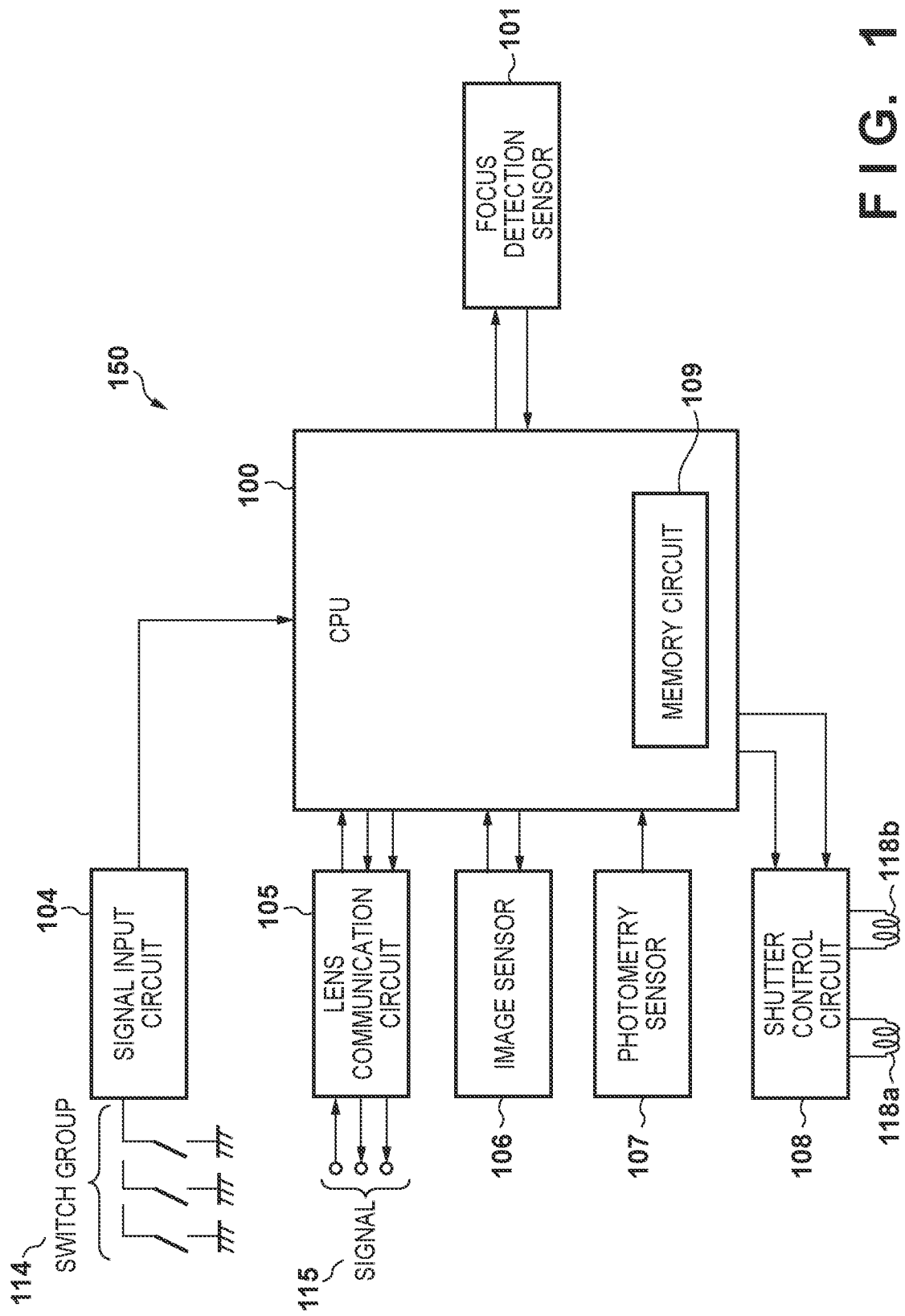
FIG. 1 is a block diagram illustrating the overall configuration of a camera body of a digital camera serving as a first embodiment of an image capturing apparatus according to the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating the overall configuration of a camera body 150 of a digital camera serving as a first embodiment of an image capturing apparatus according to the present invention.

In FIG. 1, a signal input circuit 104, an image sensor 106 constituted by a CMOS sensor, a CCD, or the like, and a photometry sensor 107 are connected to a camera microcomputer ("CPU" hereinafter) 100. The photometry sensor 107 is disposed at a point midway along a viewfinder optical system, includes an image sensor such as a CCD or CMOS sensor, and performs subject recognition processing such as photometric computations, face detection computations, tracking computations, and light source detection. The signal input circuit 104 senses a switch group 114 for various types of operations of the camera. A shutter control circuit 108 for controlling shutter magnets 118a and 118b, and a focus detection sensor 101, are also connected to the CPU 100. A signal 115 is transmitted to a shooting lens 200, illustrated in FIG. 2 and described later, via a lens communication circuit 105, to control the position and aperture of a focus lens. Camera operations are determined by a photographer operating the switch group 114. The switch group 114 includes a release button, a dial for selecting a focus detection region, and the like.

The focus detection sensor 101 is a CMOS image sensor (area sensor) in which pixels having photodiodes (photoelectric conversion elements) are arranged two-dimensionally, and is configured to be capable of global electronic shutter operations. Circuit reset operations and photodiode reset operations are performed, and charge accumulation operations are started, in response to a charge accumulation starting instruction from the CPU 100.

An accumulation time for charge accumulation can be set individually on a region-by-region basis, and the accumulation time is set by controlling the aforementioned circuit reset operations and photodiode reset operations on a region-by-region basis. It is desirable that the timing of the end of the accumulation be set to the same time for each region. The reason for this will be described later. When an accumulation time set in advance by the CPU 100 is reached, a charge accumulated in the photodiode is (can be) transferred to a memory unit (not shown) in peripheral circuitry of the photodiode. Once the transfer of the charges to the memory units is complete for all of the pixels, the CPU 100 is notified that the charge accumulation is complete. The period of this series of operations, from the start of accumulation to the end of the transfer of the charges to the memory units, will be called an "accumulation state".

Next, image signals accumulated in the accumulation state and stored in the memory units are read out on a region-by-region basis in response to a readout instruction from the CPU 100. Because different regions cannot be read out at the same time, it is necessary to read out the regions in order. Light also strikes the memory units during the aforementioned period from the end of accumulation to the readout. This produces charges in the memory units, which are then added to the pixel signals transferred from the photodiodes. This phenomenon will be called "light leakage" hereinafter. This light leakage causes disturbances in the image signals and produces error in focus detection. It is desirable to shorten the period from the end of accumulation to readout in order to reduce the amount of light leakage. This is why, as mentioned above, the timing of the end of accumulation is set to the same time in each of the regions. The period in which the above-described series of readouts is performed will be called a "readout state" hereinafter.

By controlling the focus detection sensor 101, the CPU 100 can obtain a pair of image signals having parallax with respect to each other via the optical system illustrated in FIG. 3, which will be described later. Then, the focus state is detected from a phase difference between the obtained pair of image signals, and the focal position of the shooting lens 200 is controlled (focus detection processing).

The CPU 100 also detects a subject luminance by controlling the photometry sensor 107, and determines an aperture value of the shooting lens 200 (described later), a shutter speed, and the like. The aperture value of the shooting lens 200 is controlled via the lens communication circuit 105, and the shutter speed is controlled by adjusting a time for which the magnets 118a and 118b are electrified via the shutter control circuit 108. Furthermore, image capturing operations are performed by controlling the image sensor 106.

The CPU 100 includes memory circuits 109 such as ROM, which stores programs for controlling timer and camera operations, RAM for storing variables, and EEPROM (electrically erasable and writable memory) for storing various parameters.

The configuration of the optical system of the digital camera will be described next with reference to FIG. 2. The majority of a light beam from a subject, incident through the shooting lens 200, is reflected upward by a quick-return mirror 205 and formed as a subject image on a viewfinder screen 203. The photographer can observe this image via a pentaprism 201 and an ocular lens 202.

A portion of the light beam incident on the pentaprism 201 is formed as an image on the photometry sensor 107 via an optical filter 212 and an image forming lens 213. A subject luminance can be measured by processing an image signal obtained by photoelectrically converting this image.

A portion of the light beam from the subject passes through the quick-return mirror 205 and is bent downward by a sub-mirror 206 to the rear, and passes through a visual field mask 207, a field lens 211, an aperture 208, and a secondary image forming lens 209 to form an image on the focus detection sensor 101. The focus state of the shooting lens 200 can be obtained by processing an image signal obtained by photoelectrically converting this image. During shooting, the quick-return mirror 205 and the sub-mirror 206 flip up and out from an optical path. As a result, the entire incident light beam forms an image on the image sensor 106, and the subject image is exposed.

Figure 2:
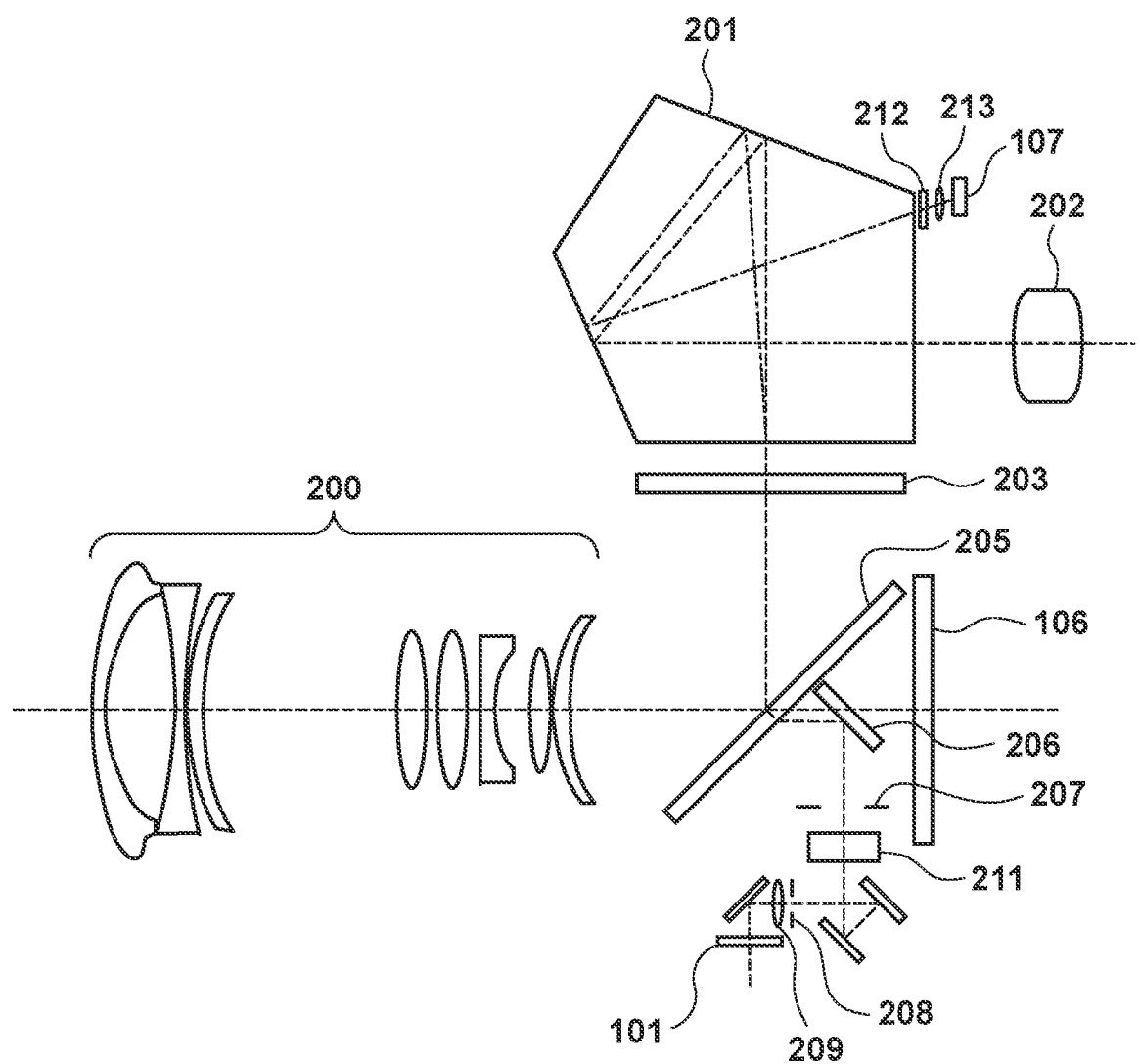
FIG. 2 is a diagram illustrating the configuration of an optical system of the camera.

In FIG. 2, a focus detection apparatus is constituted by the focus detection sensor 101 along with the optical system including the elements from the visual field mask 207 to secondary image forming lens 209, and the focus detection method is a known phase difference detection method. Furthermore, the focus states of a plurality of different focus detection regions can be detected.

Figure 3:
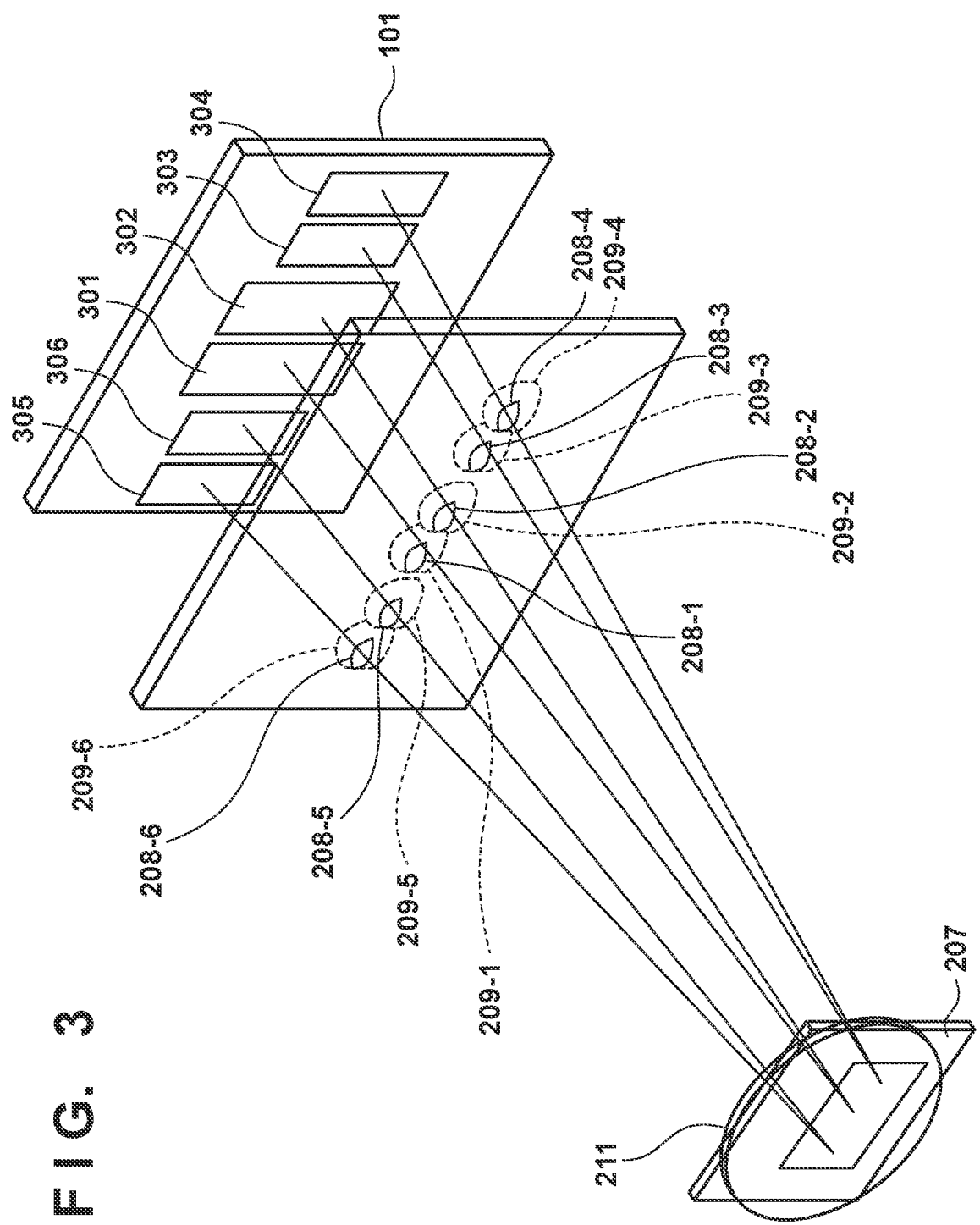
FIG. 3 is a diagram illustrating the formation of an image on a focus detection sensor according to the first embodiment.

FIG. 3 is a diagram illustrating, in detail, the configuration of the optical system involved in focus detection. The light beam from the subject, which has been reflected by the sub-mirror 206, first forms an image near the visual field mask 207 illustrated in FIG. 3. The visual field mask 207 is a light-blocking member for determining the focus detection region in the image, and includes an opening, longer in the horizontal direction, in a central part.

The field lens 211 has an action of forming an image from each of openings in the aperture 208 on respective partial regions of an exit pupil (pupil region) of the shooting lens 200. Six secondary image forming lenses 209-1 to 209-6, constituted by three pairs of lenses with each pair corresponding to one of three focus detection regions, are disposed to the rear of the aperture 208. Each of the secondary image forming lenses 209-1 to 209-6 is disposed so as to correspond to one of openings 208-1 to 208-6 in the aperture 208. Light beams passing through the secondary image forming lenses 209-1 and 209-2 form images in regions CA 301 and CB 302 of the focus detection sensor 101. Likewise, light beams passing through the secondary image forming lenses 209-3 and 209-4 form images in regions RA 303 and RB 304, and light beams passing through the secondary image forming lenses 209-5 and 209-6 form images in regions LA 305 and LB 306.

Figure 4:
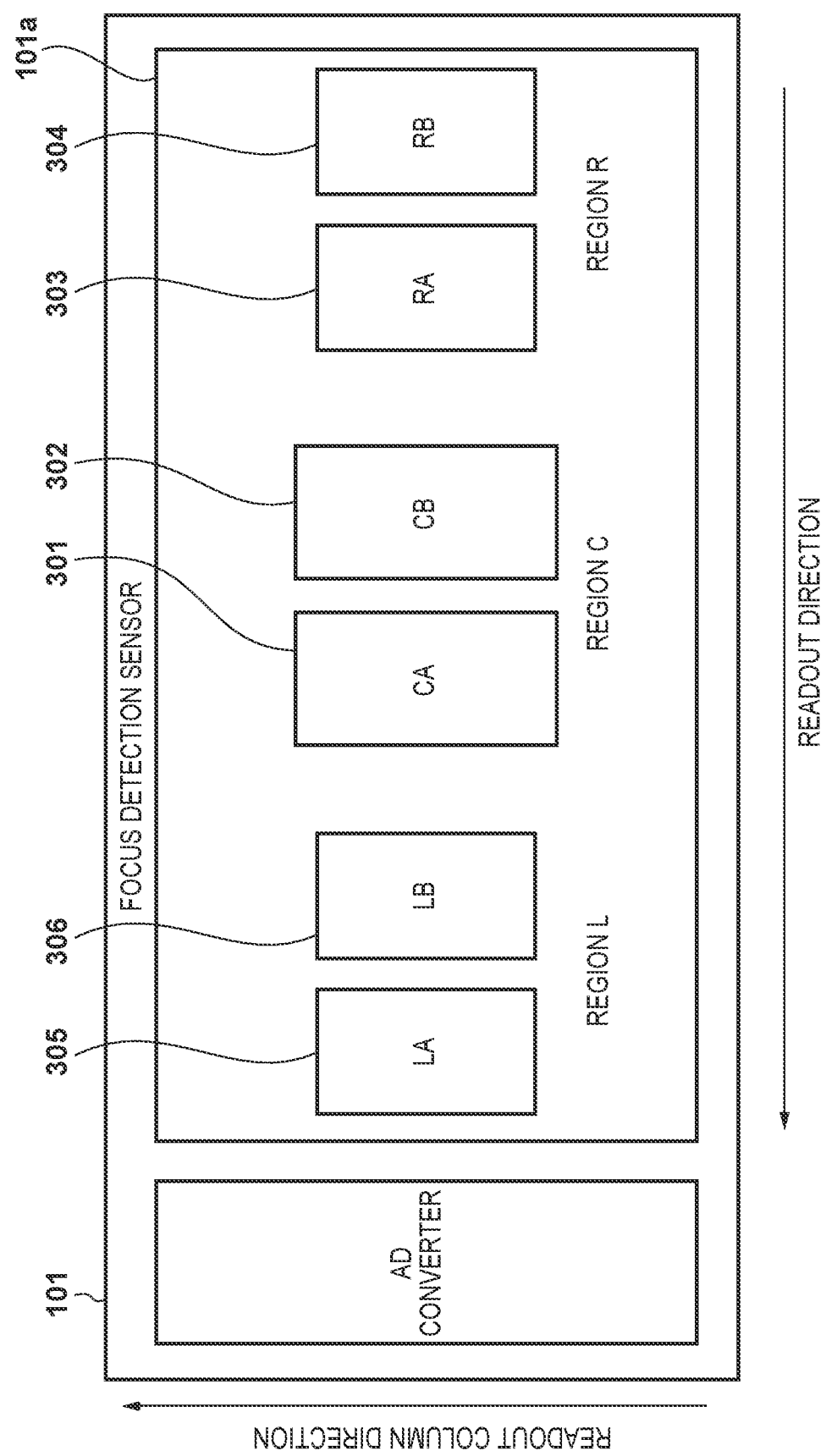
FIG. 4 is a diagram illustrating positional relationships among focus detection regions in a viewfinder.

The configuration of the focus detection sensor 101 will be described next with reference to FIG. 4. The focus detection sensor 101 includes a pixel unit 101a, and an AD converter 101b which converts signals read out from the pixel unit 101a into digital signals. In the pixel unit 101a, after charges have been accumulated, the accumulated signals are transferred to memory units disposed near the corresponding pixels. Columns of the memory units (columns of memory units corresponding to each of vertical columns of pixels, in FIG. 4) are then read out consecutively from left to right. In other words, in the present embodiment, the signals are read out in units of the vertical columns illustrated in FIG. 4. This vertical direction (the shorter direction of the focus detection sensor 101) will be called a "readout column direction" in the present embodiment. The signals from each column of pixels (memory units) are transferred in the horizontal direction using a signal line and input to the AD converter 101b. This horizontal direction (the longer direction of the focus detection sensor 101) will be called a "readout direction" in the present embodiment. Note that the focus detection sensor 101 can change the order of readout columns as desired. Furthermore, in FIGS. 3 and 4, the regions LA 305 and LB 306 of the focus detection sensor 101 will be called an "L region"; the regions CA 301 and CB 302, a "C region"; and the regions RA 303 and RB 304, an "R region".

Figure 5:
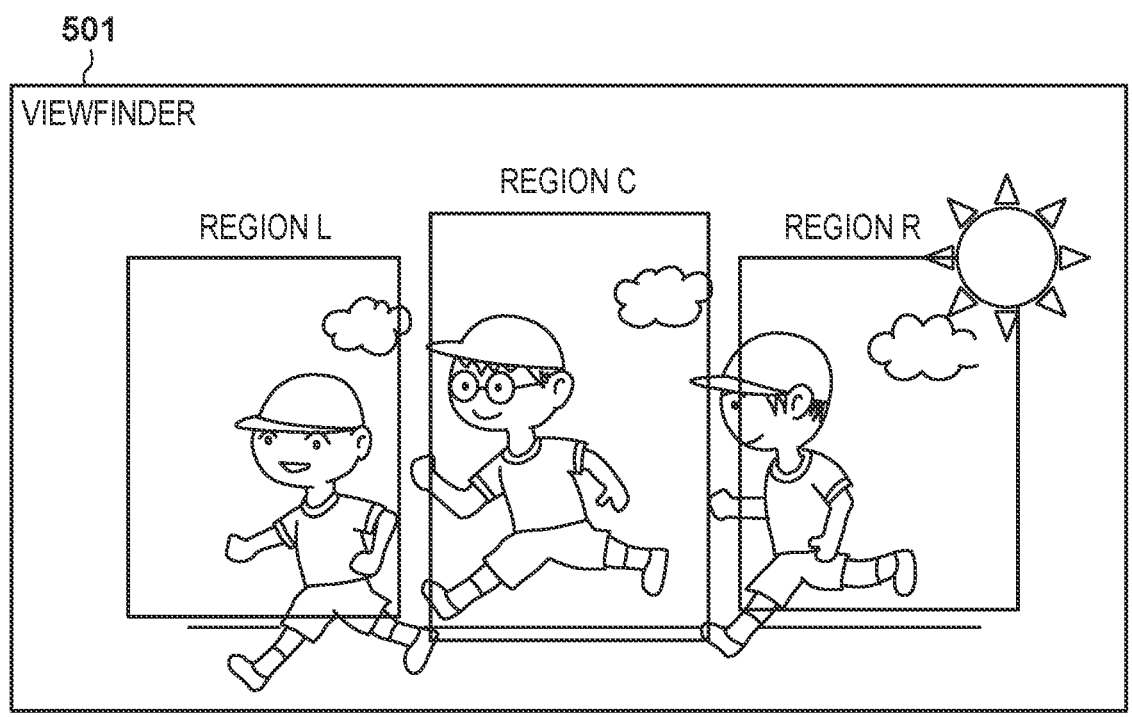
FIG. 5 is a diagram illustrating positional relationships among the focus detection regions in the viewfinder.
Figure 6:
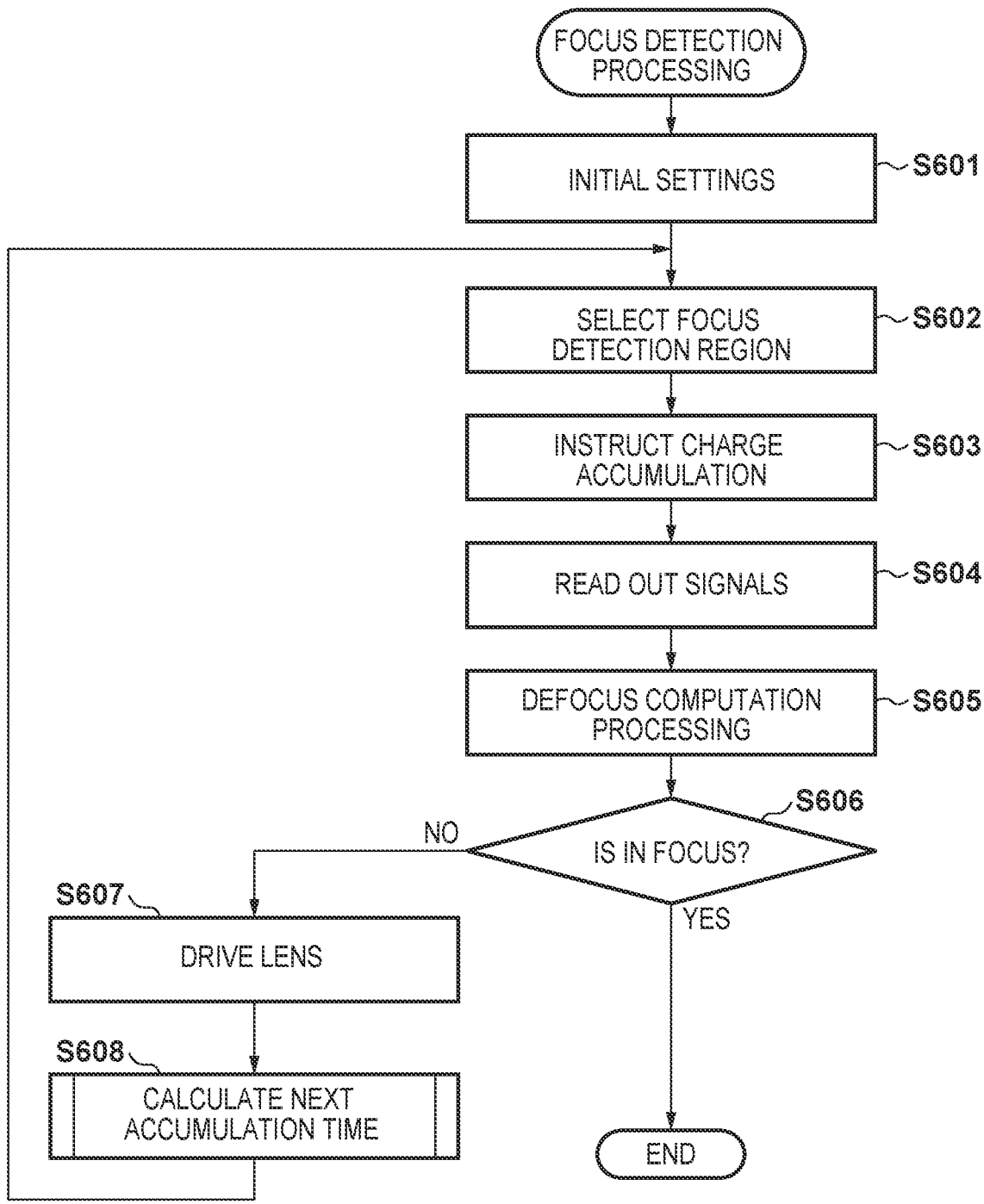
FIG. 6 is a flowchart illustrating focus detection processing according to the first embodiment.

FIG. 5 is a diagram illustrating positional relationships among the focus detection regions in a viewfinder 501. The viewfinder 501 can be used to make observations through the ocular lens 202. The focus detection regions illustrated in FIG. 4, i.e., the L region, the C region, and the R region, are arranged in the viewfinder 501. FIG. 6 is a flowchart illustrating the flow of focus detection processing according to the present embodiment. When the CPU 100 receives a focus detection start signal in response to the switch group 114 being operated, the CPU 100 controls the focus detection sensor 101 to start the focus detection processing.

In step S601, the CPU 100 makes initial settings for the focus detection processing. The CPU 100 writes the initial settings for the focus detection sensor 101 into a register, and sets an accumulation time for initial accumulation. Then, one of the following modes is set for the focus detection regions described later: a discretionary selection mode, in which a given focus detection region selected by a user is used, and an automatic selection mode, in which a focus detection region selected by the CPU 100 automatically using a known algorithm is used.

In step S602, the CPU 100 selects the focus detection region as described above. The present embodiment assumes that there is at least one focus detection region for each of the C region, the R region, and the L region. If a given focus detection region has been selected by the user in step S601, the selected focus detection region is determined to be a focus detection region corresponding to a main subject region. On the other hand, if automatic selection by the CPU 100 is set, the CPU 100 selects the focus detection region automatically.

The following methods can be given as examples of selecting the focus detection region automatically. One method involves selecting the focus detection region where the focus position is closest to the near end, on the basis of a defocus amount calculated in step S605 (described later). Another method involves selecting the focus detection region at a position where a main subject has been determined to be present, on the basis of the position of a face detected using the photometry sensor 107. During the first focus detection processing, when the defocus amount could not be detected in step S605 (described later), and so on, the sequence may move to step S603 without a focus detection region being selected.

In step S603, the CPU 100 instructs the focus detection sensor 101 to start charge accumulation. Having received the instruction to start charge accumulation, the focus detection sensor 101 performs the circuit reset operations and the photodiode reset operations, and starts charge accumulation operations, ending the charge accumulation operations after a predetermined amount of time has passed and then transferring the accumulated charges to the memory units of the corresponding pixels.

In step S604, the CPU 100 reads out the signals stored in the memory units, which were accumulated in step S603.

In step S605, the CPU 100 calculates a defocus amount for the image signals read out in step S604. The defocus amount is calculated through known defocus computations which detect a focus state of the shooting lens 200 (a defocus amount) using a pair of image signals. Here, the defocus amount (mm) is found by multiplying a phase difference (number of bits) of the focus detection sensor 101 by a sensor pitch (mm) and an optical coefficient such as the baseline length of the focus detection system. A maximum value (Peak) and a minimum value (Bottom) of each signal used to calculate the defocus amount are also found.

In step S606, the CPU 100 determines whether or not the focus state of the shooting lens 200 is an in-focus state on the basis of the defocus amount calculated in step S605. The lens is determined to be in the in-focus state when the defocus amount is within a desired range, e.g., within $\frac{1}{4} F\delta$ (where F is the aperture value of the lens and $\delta$ is a constant (20 µm)). For example, if the lens aperture value F is 2.0, the lens is determined to be in focus if the defocus amount is 10 µm or less, and the focus detection processing then ends. However, if the defocus amount is greater than 10 µm and it has been determined that the lens is not in focus, the sequence moves to step S607 in order to bring the focus state of the shooting lens 200 to an in-focus position.

In step S607, the CPU 100 makes a lens driving instruction to the shooting lens 200 via the lens communication circuit 105 on the basis of the defocus amount. In step S608, the CPU 100 calculates and sets a value for the accumulation time of the focus detection sensor 101 in the next instance of the focus detection processing, in accordance with the subject luminance. The CPU 100 then returns the sequence to step S602 and repeats the operations of steps S602 to S608 until it is determined that the lens is in the in-focus state. The foregoing is the flow of the focus detection processing.

Figure 7:
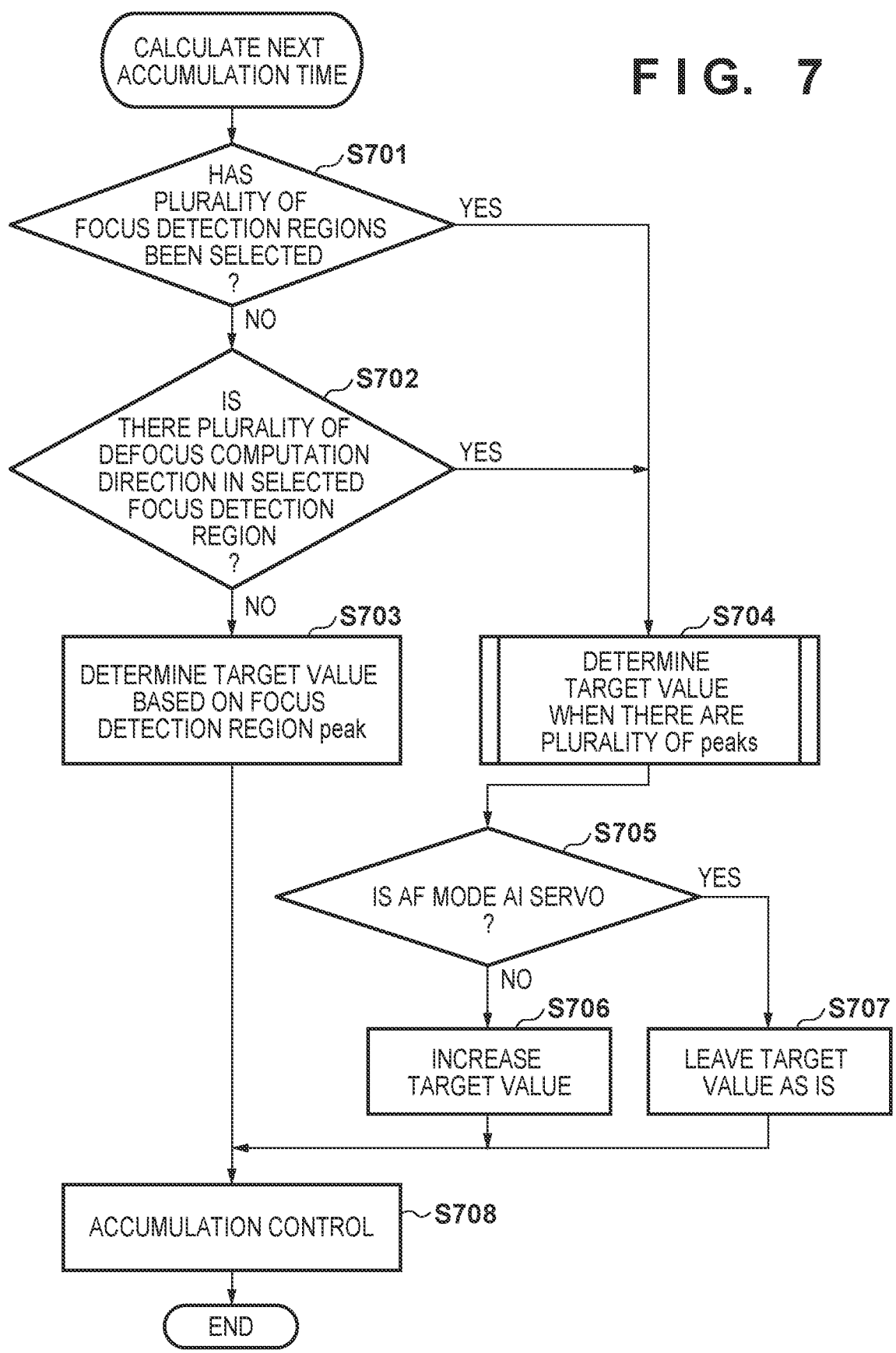
FIG. 7 is a flowchart illustrating operations for determining an accumulation time according to the first embodiment.

FIG. 7 is a flowchart illustrating processing for calculating the next accumulation time, carried out in step S608 illustrated in FIG. 6.

In step S701, it is determined whether a plurality of focus detection regions have been selected by the user. The sequence moves to step S704 if a plurality of focus detection regions have been selected, and to step S702 if only a single focus detection region has been selected.

In step S702, it is determined whether or not there are a plurality of defocus computation directions in the one selected focus detection region. Here, depending on the combination of pixels in the focus detection sensor 101, there are situations where horizontal lines (contrast variations in the vertical direction) can be detected, and situations where vertical lines (contrast variations in the horizontal direction) can be detected. The "defocus computation direction" is the direction of the detected contrast variations. In other words, when, for example, both vertical lines and horizontal lines can be detected (there are two computation directions) (as with what is known as a "cross sensor"), there will be a plurality of defocus computation directions in the focus detection region. If there are a plurality of defocus computation directions in step S702, the sequence moves to step S704. However, if there is only one defocus computation direction, the sequence moves to step S703.

In step S703, the next accumulation time is determined on the basis of the highest signal value (Peak) in the focus detection region obtained through the present instance of focus detection. The next accumulation time is determined so that Peak takes on a predetermined value (called a "target value" hereinafter).

In step S704, when a plurality of focus detection regions have been selected, or if only a single focus detection region has been selected but the region has a plurality of defocus computation directions, a target signal value (the target value) is determined for the next accumulation.

Figure 8:
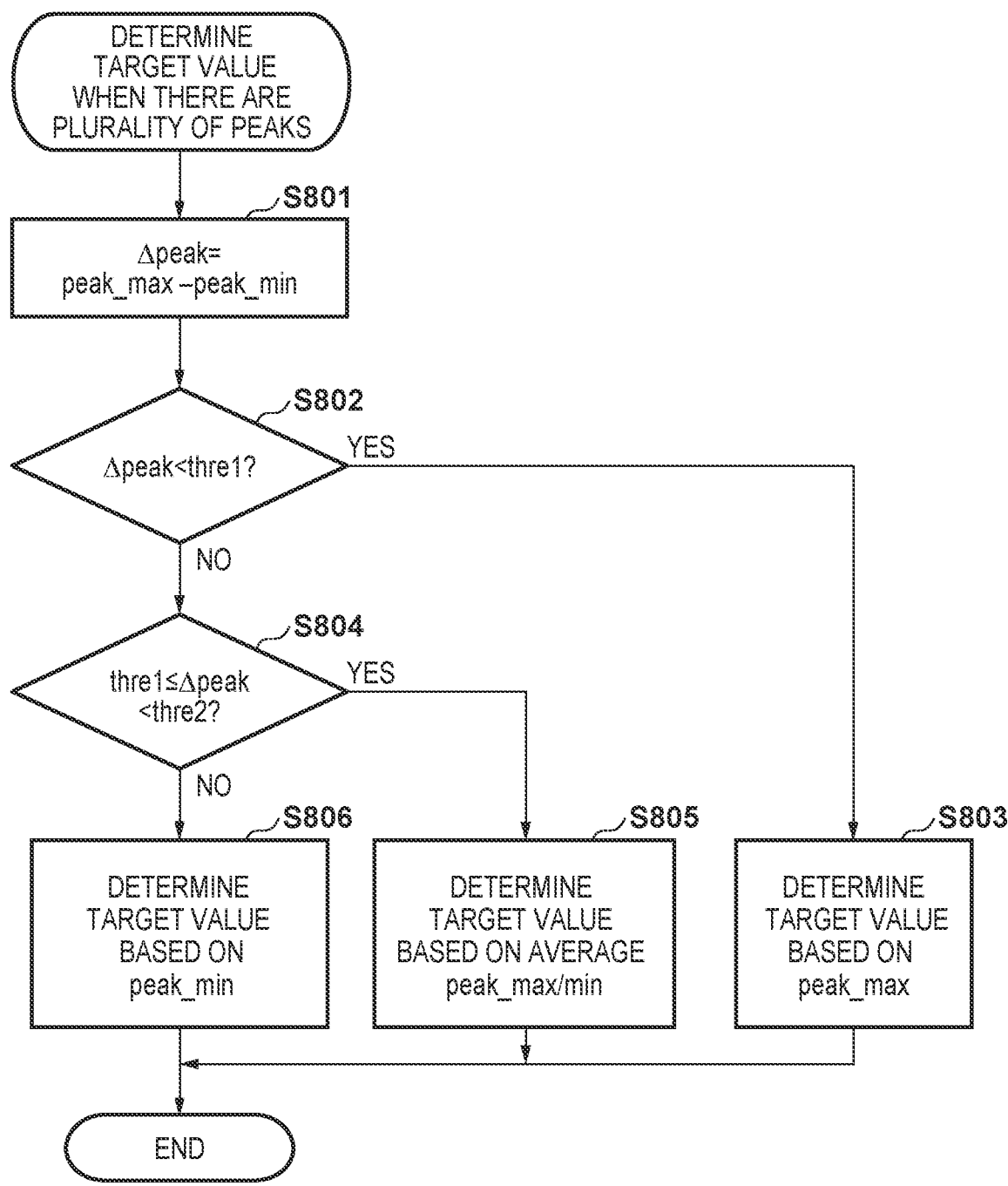
FIG. 8 is a flowchart illustrating operations for determining a target value according to the first embodiment.

FIG. 8 is a flowchart illustrating operations for determining the target value, performed in step S704 illustrated in FIG. 7.

In step S801, of the Peaks (peak values) in the plurality of focus detection regions from step S701, the highest peak, i.e., Peak_max, and the lowest peak, i.e., Peak_min, are determined. At this time, if each focus detection region has a plurality of defocus computation directions, Peak is calculated for each of those directions. Likewise, Peak_max and Peak_min are determined for the single focus detection region from step S702. Then, ΔPeak, which is the difference between Peak_max and Peak_min, is calculated.

In step S802, it is determined whether or not ΔPeak calculated in step S801 is less than a threshold thre1. If ΔPeak is less than the threshold thre1, the sequence moves to step S803. However, if ΔPeak is greater than or equal to the threshold thre1, the sequence moves to step S804.

In step S803, the target value, which is the target value of the maximum signal value Peak_max for the next accumulation, is determined on the basis of the maximum signal value Peak_max in the present instance of focus detection. The sequence then returns to step S705 in FIG. 7. In step S803, it is assumed that the difference ΔPeak between Peak_min and Peak_max is small, and it is determined that appropriate accumulation control can be performed using Peak_min by aligning Peak_min with Peak_max. Although Peak_max is used as a reference in the present embodiment, it should be noted that Peak_min, the average of Peak_max and Peak_min, or the like may be used as a reference instead.

In step S804, it is determined whether ΔPeak calculated in step S801 is greater than or equal to the threshold thre1 and less than a threshold thre2. Here, the magnitude relationship between thre1 and thre2 is thre1<thre2. If ΔPeak is between thre1 and thre2, the sequence moves to step S805. However, if ΔPeak is greater than or equal to thre2, the sequence moves to step S806.

In step S805, the target value is determined on the basis of the average of Peak_max and Peak_min, and the sequence then returns to step S705 of FIG. 7. Step S805 assumes a situation such as where there are a plurality of focus detection regions, the contrast varies due to there being a plurality of defocus computation directions, or the like. If the target value is determined on the basis of one of Peak_max and Peak_min, an appropriate signal value cannot be obtained using the other. As such, the accumulation is controlled having determined the target value on the basis of the average.

In step S806, the target value is determined on the basis of Peak_min (the target value is determined so that Peak_min takes on a desired value in the next instance of accumulation), and the sequence then returns to step S705 of FIG. 7. Step S806 assumes a situation where the luminance in the vicinity of the subject varies greatly, such as with backlighting and in night scenes. When the subject is dark and the background is bright, determining the target value on the basis of Peak_max or the average may produce blocked-out shadows in the object and make focus detection impossible. The target value is therefore determined on the basis of Peak_min.

Returning to FIG. 7, in step S705, it is determined whether or not an autofocus mode is a mode that keeps a moving subject in focus (AI SERVO mode). The sequence moves to step S707 if the autofocus mode is the AI SERVO mode. However, the sequence moves to step S706 if the autofocus mode is not the AI SERVO mode.

In step S706, the target value found in step S704 is increased (the accumulation time is lengthened), and the sequence then moves to step S708. This is because there are a plurality of defocus computation regions, and the defocus can therefore be detected even in regions with low signal levels. Furthermore, because it is assumed that the subject is not moving, the subject will not be lost during accumulation even if the target value is increased and the next accumulation time is extended.

Note that in step S706, the target value is set to four times the target value determined in step S704 in times of high luminance, and is set to twice the target value determined in step S704 in times other than times of high luminance, for example. Because the accumulation time can be shortened in times of high luminance, the accuracy is improved by increasing the target value to four times. In times aside from times of high luminance, the target value is set to twice the value in order to suppress a drop in responsiveness.

Instead of the processing for increasing the target value in step S706, the accumulation time may be extended, or Peak_min may be controlled to take on the same value as the target value. At this time, an accumulation time upper limit may be set for the accumulation time corresponding to the initial target value.

In step S707, the sequence moves to step S708 without the target value obtained in step S704 being changed. Unlike step S706, the subject is assumed to be moving in AI SERVO mode, and if the target value is increased (by lengthening the accumulation time), there is a risk of losing the subject during accumulation. Therefore, when in AI SERVO mode, the sequence can move to the next step without changing the target value.

In step S708, the accumulation of the focus detection sensor 101 is controlled so that the target value found in step S703, step S706, or step S707 is attained.

Although the foregoing embodiment describes controlling the accumulation time in order to bring the signal of the focus detection sensor 101 closer to the target value, it should be noted that the signal may be brought closer to the target value by controlling a gain by which the signal of the focus detection sensor 101 is multiplied.

Second Embodiment

The configuration and overall operations of an image capturing apparatus according to a second embodiment are the same as those described in the first embodiment with reference to FIGS. 1 to 6, and will therefore not be described. In the present embodiment, the defocus computation processing of step S605 in FIG. 6 and the processing for calculating the next accumulation time of step S608 are different from those performed in the first embodiment.

Figure 9:
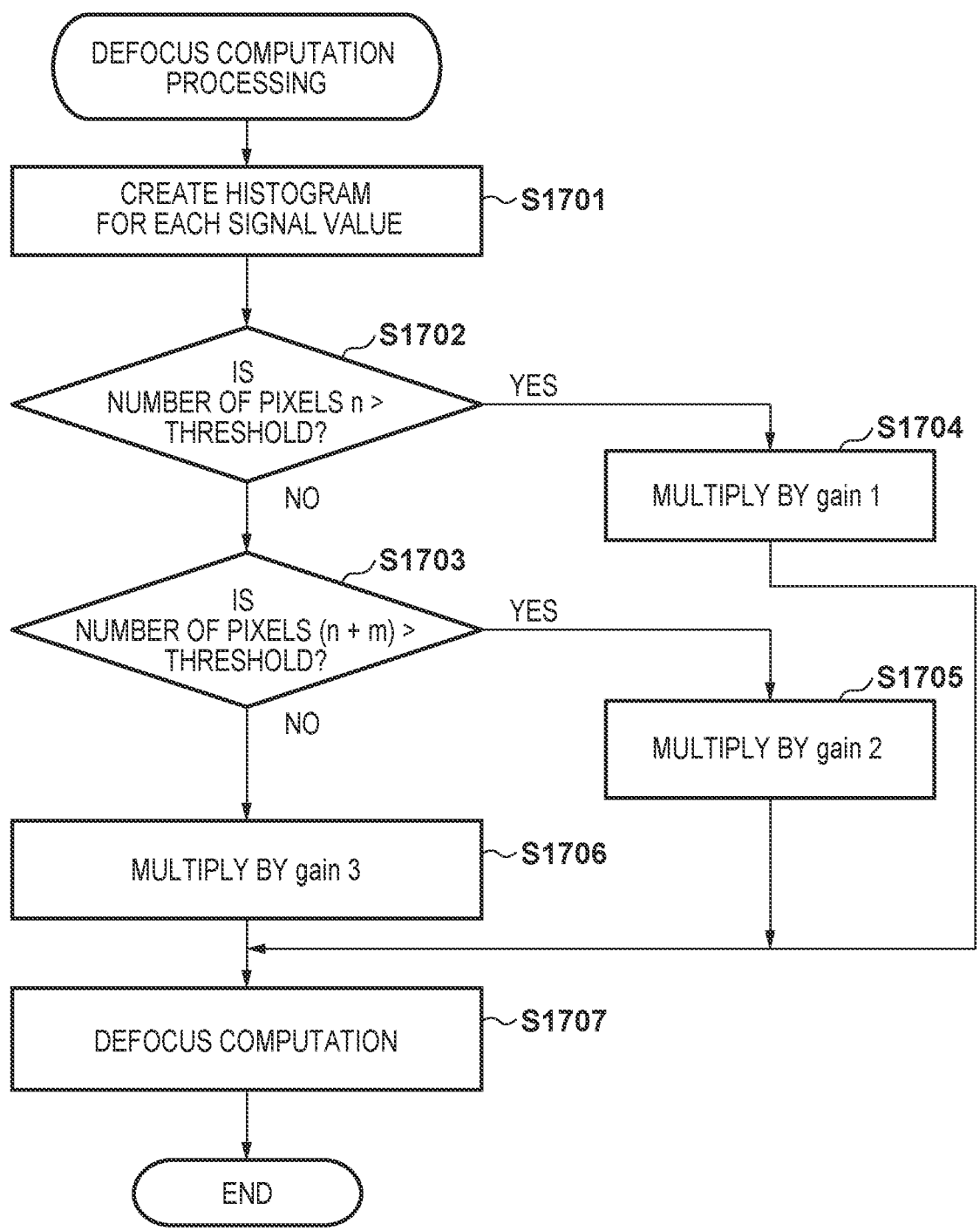
FIG. 9 is a flowchart illustrating defocus computation processing according to a second embodiment.

FIG. 9 is a diagram illustrating the defocus computation processing of step S605 of FIG. 6 according to the second embodiment. FIG. 9 illustrates processing for conversion to a necessary signal level when, in the signal readout of step S604 in FIG. 6, a signal level has been obtained over a higher range than a dynamic range which can be computed in the defocus computations of step S605.

Figure 14A:
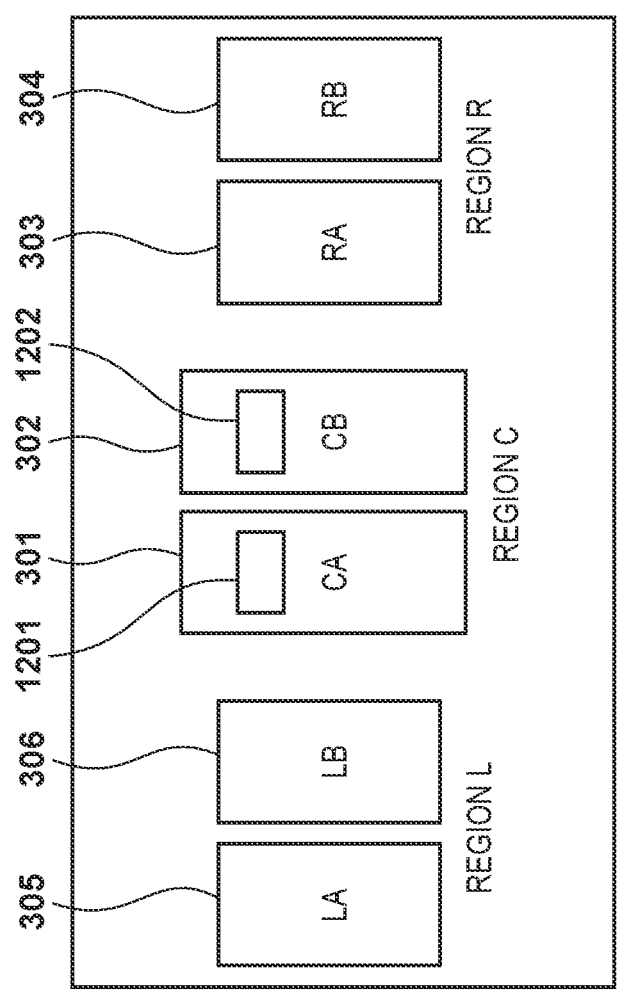
FIGS. 14A to 14C are diagrams illustrating divided defocus computation regions according to the third embodiment.
Figure 14B:
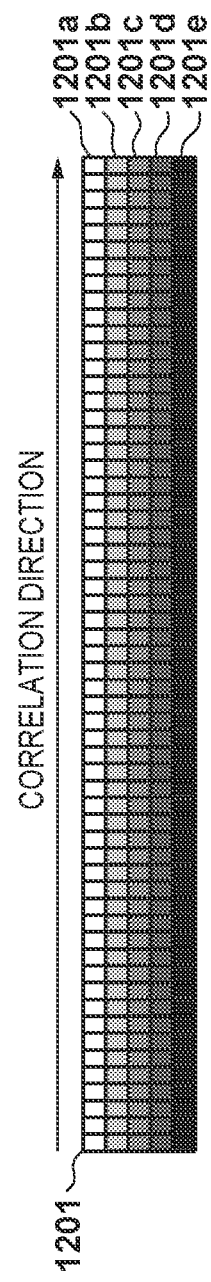
Figure 14C:
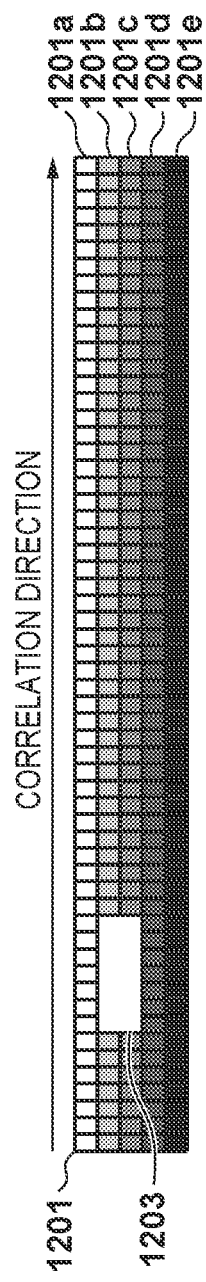

In step S1701, a histogram is created for image signal values in a defocus computation region 1201 (see FIGS. 14A-14C).

Figure 10:
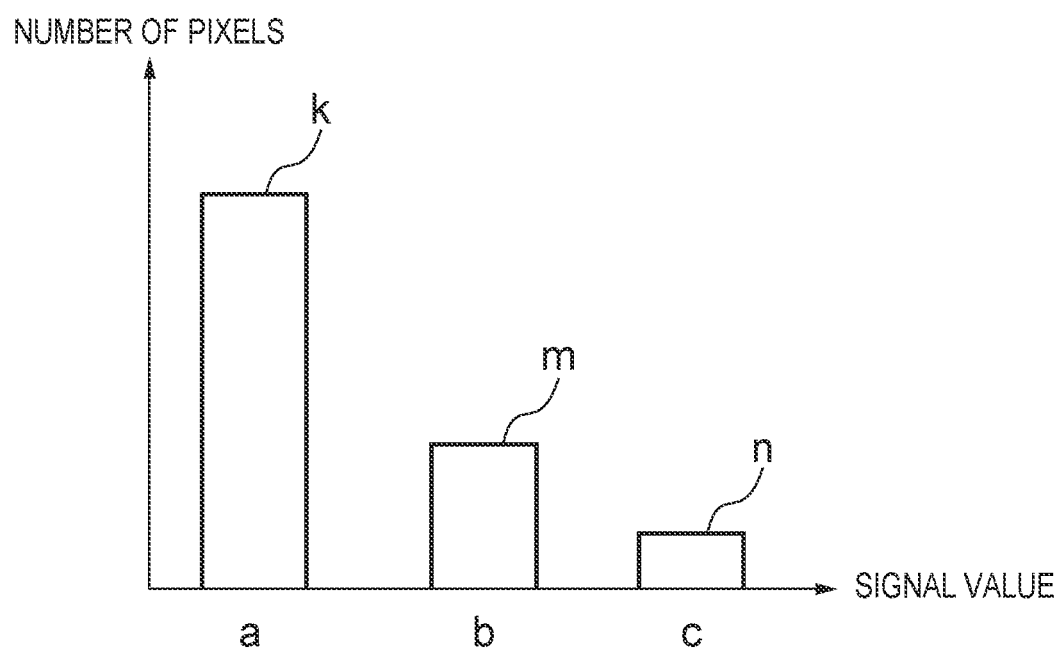
FIG. 10 is a diagram illustrating a histogram of signal values.

The signal value histogram will be described with reference to FIG. 10. The signal value histogram in FIG. 10 shows a distribution of a number of pixels for each signal value, taking the number of pixels on the vertical axis and the signal value on the horizontal axis. The number of pixels with a signal value of less than a is k, the number of pixels where the signal value is greater than a but less than or equal to b is m, and the number of pixels where the signal value is greater than b but less than or equal to c is n. The magnitudes of the signal values are in a relationship of a<b<c. Here, the signal value a is the maximum value of the signal value that can be used in the defocus computations. The signal value c indicates an upper limit of the pixel signal value.

Returning to FIG. 9, in step S1702, it is determined whether or not the number of pixels n in the signal value histogram is greater than a threshold. The sequence moves to step S1704 if n is greater than the threshold. However, the sequence moves to step S1703 if n is less than or equal to the threshold.

In step S1703, it is determined whether or not the sum of the number of pixels n and the number of pixels m in the signal level histogram is greater than a predetermined pixel number threshold. The sequence moves to step S1705 if the sum is greater than the predetermined pixel number threshold. However, the sequence moves to step S1706 if the sum is less than or equal to the predetermined pixel number threshold.

In step S1704, all of the pixels in the defocus computation region 1201 are multiplied by a gain 1. In step S1705, all of the pixels in the defocus computation region 1201 are multiplied by a gain 2. In step S1706, all of the pixels in the defocus computation region 1201 are multiplied by a gain 3.

Here, a magnitude relationship among gain 1 to gain 3 is 1≧gain 3>gain 2>gain 1. A pixel having a signal value higher than a predetermined signal value threshold will saturate. However, adjusting the signal value threshold makes it possible to intentionally saturate point light sources in scenes with people in front of a night scene background and the like, which makes it possible to find the subject contrast.

In step S1707, known defocus computations are performed.

In this manner, the signal level in the defocus computation region 1201 is adjusted by changing the value of the gain by which signals are multiplied in accordance with the signal values and a frequency distribution of the pixels. This makes it possible to perform defocus computations without a loss of contrast in the subject.

Figure 11:
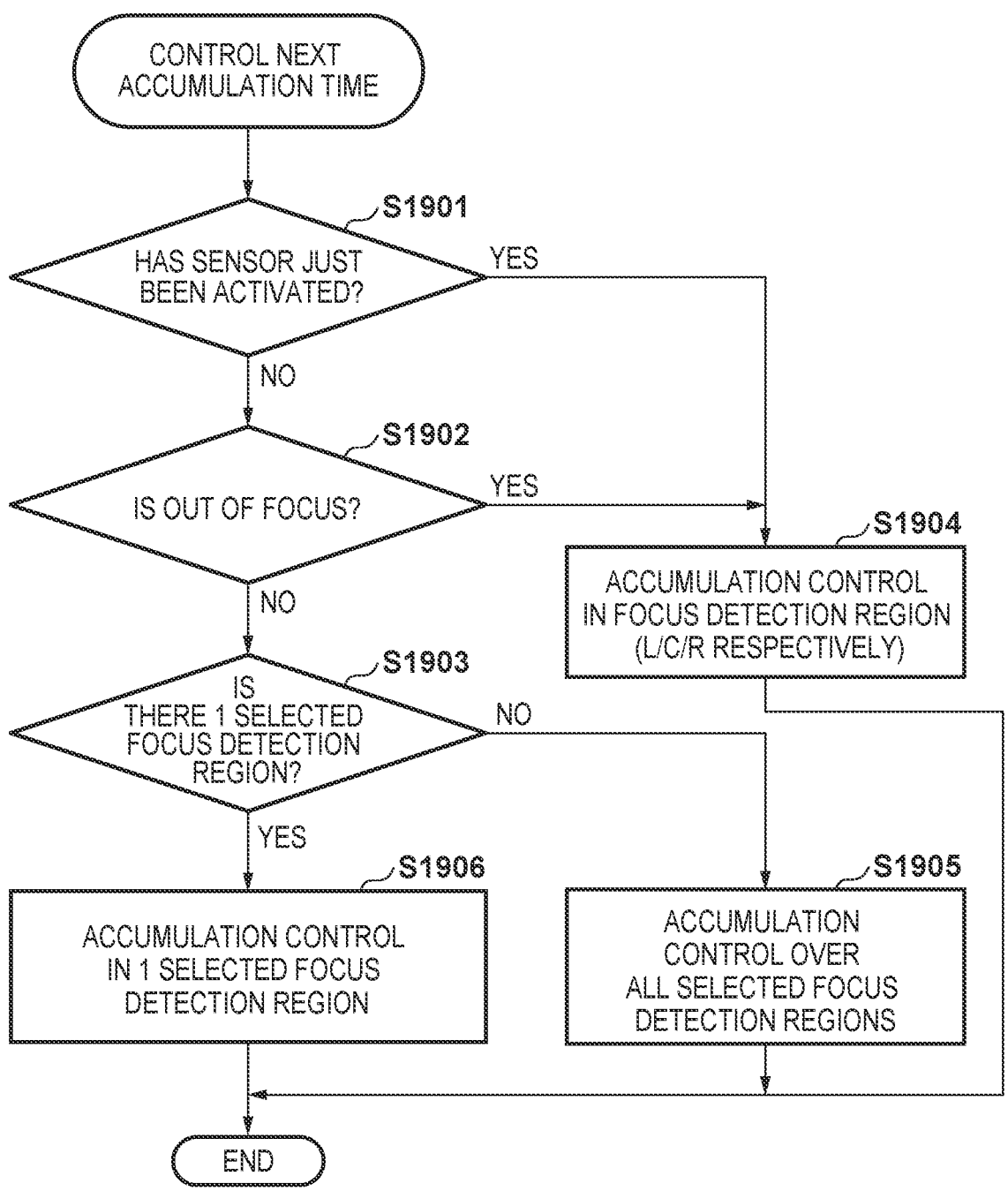
FIG. 11 is a flowchart illustrating accumulation control according to the second embodiment.
Figure 12A:
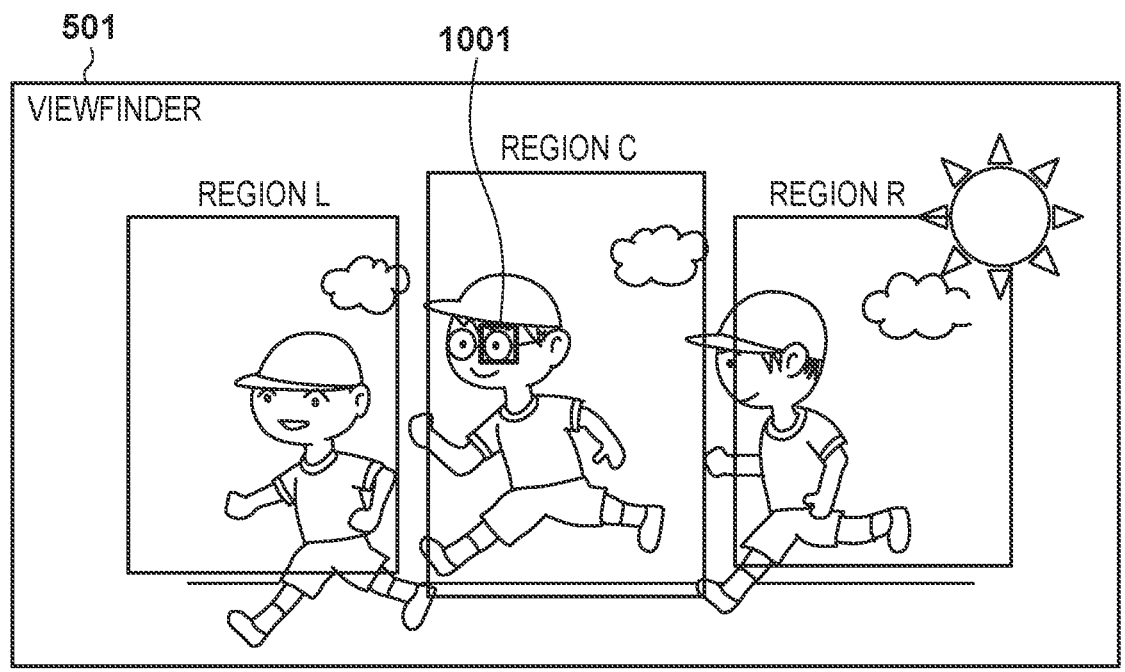
FIGS. 12A and 12B are diagrams illustrating focus detection regions selected in the second embodiment.
Figure 12B:
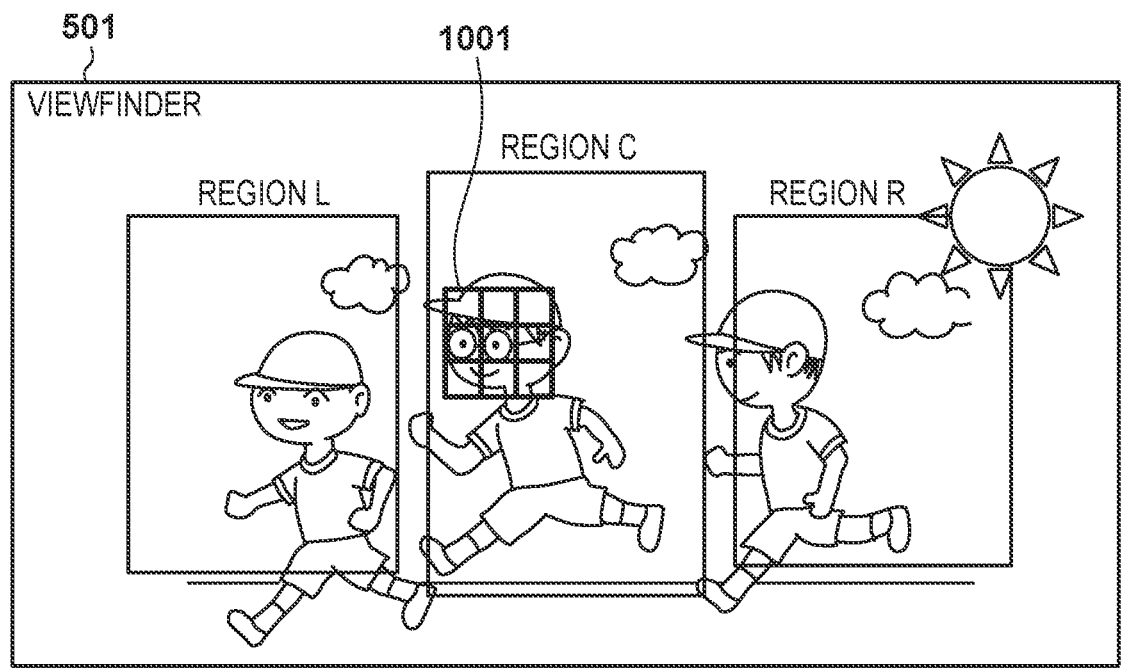

The calculation of the next accumulation time will be described next with reference to FIGS. 11, 12A, and 12B.

In step S1901, it is determined whether or not the focus detection sensor 101 has just been activated. The focus detection sensor 101 is activated when the camera body 150 is turned on, when the camera body 150 has come out of a sleep mode entered when the camera body 150 has not been operated for a certain amount of time, and so on. If the focus detection sensor 101 has just been activated (i.e., if it is the first instance of accumulation after activation), the sequence moves to step S1904. However, if the focus detection sensor 101 has not just been activated, the sequence moves to step S1902.

In step S1902, it is determined whether or not the focus is out of focus on the basis of the result of the defocus computation processing of step S605. If the focus is out of focus, the sequence moves to step S1904. However, if the focus is in focus, the sequence moves to step S1903. In step S1903, it is determined whether or not only one focus detection region has been selected by the user.

The focus detection region selected by the user will be described with reference to FIGS. 12A and 12B. FIG. 12A is a diagram illustrating a case where there is a single focus detection region. FIG. 12B is a diagram illustrating a case where there are a plurality of focus detection regions. In step S1903, it is determined whether there is a single focus detection region as in FIG. 12A, or if there are a plurality of focus detection regions as in FIG. 12B.

Returning to FIG. 11, in step S1904, a simple arithmetic mean is found for the signal levels of all pixels in each of the L region, the C region, and the R region of the viewfinder 501, regardless of the position of the focus detection region, and the accumulation is controlled so that the average value matches a desired signal level. When the focus detection sensor 101 has just been activated and the focus is out of focus, the accumulation control in the focus detection region may not be appropriate. The accumulation is therefore controlled using the average value of the entire focus detection region, which stabilizes the accumulation control.

In step S1905, there are a plurality of focus detection regions selected by the user, and thus in a focus detection region containing the subject, the accumulation is controlled not only in that focus detection region, but rather in all of the selected focus detection regions. In this case, the accumulation is controlled, using the Peak and Bottom values found in step S605, so that the difference between the highest Peak and the lowest Bottom in the selected plurality of focus detection regions matches the target value. This makes it possible to obtain the contrast necessary for the defocus computations. By controlling the accumulation over the entirety of the selected focus detection regions, a shift in accumulation control can be reduced even in situations where the subject is moving. In a situation where the focus detection range is broad, such as in automatic selection, the accumulation is controlled using the focus detection region where the main subject is present and information of areas around that region.

On the other hand, in a focus detection region where a subject is not present, the accumulation is controlled using the average value of the signals of the entire focus detection region, as in step S1904.

In step S1906, if there is only one focus detection region selected by the user, the exposure is controlled primarily on the basis of that focus detection region. Specifically, in a focus detection region where a subject is present, the accumulation is controlled so that the difference between Peak and Bottom in the focus detection region matches the target value. This makes it possible to obtain the contrast necessary for the defocus computations. On the other hand, in a focus detection region where a subject is not present, the accumulation is controlled using the average value of the signals of the entire focus detection region, as in steps S1904 and S1905.

As described thus far, accumulation can be controlled appropriately for the brightness of a subject by changing the region in which accumulation control is performed in accordance with a selected focus detection region, the state of the focus detection sensor 101, the focus state, and so on.

Third Embodiment

The configuration and overall operations of an image capturing apparatus according to a third embodiment are the same as those described in the first embodiment with reference to FIGS. 1 to 6, and will therefore not be described. In the present embodiment, the defocus computation processing of step S605 in FIG. 6 and the processing for calculating the next accumulation time of step S608 are different from those performed in the first embodiment.

The following will describe the defocus computation processing performed in step S605 according to the third embodiment, in a situation where the defocus computations are performed having divided the one defocus computation region 1201 (see FIG. 14A) into a plurality of sub-regions.

Figure 13:
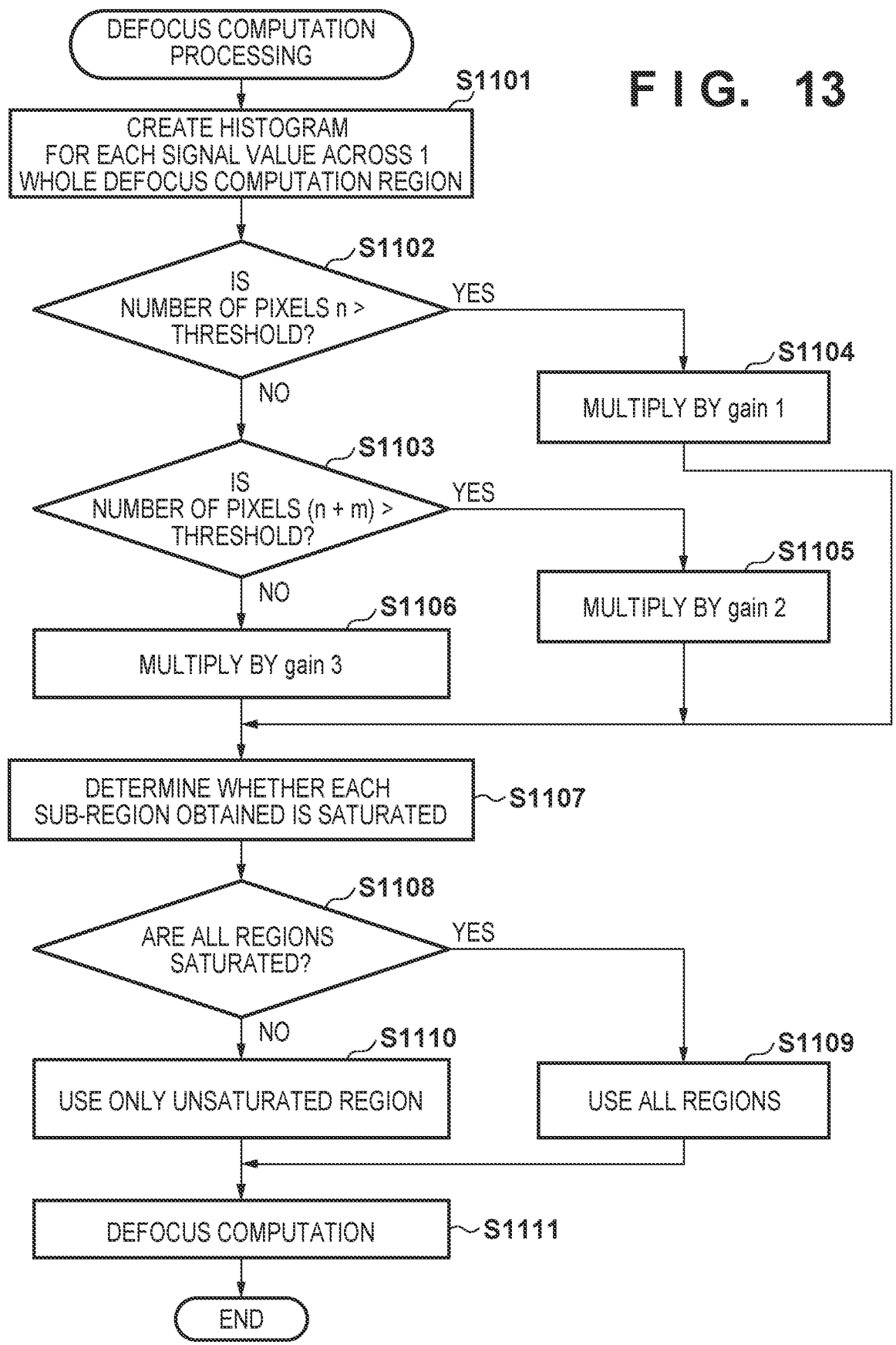
FIG. 13 is a flowchart illustrating defocus computations according to a third embodiment.

A defocus computation method used when the one defocus computation region 1201 is divided in a direction orthogonal to a correlation direction in which a known correlation computation is performed will be described with reference to FIGS. 11, 13, and 14A to 14C. FIG. 13 illustrates processing similar to that in FIG. 9, adding a situation in which the defocus computations are performed having divided the one defocus computation region 1201 into a plurality of sub-regions.

In step S1101, a signal value histogram is created for the one defocus computation region 1201 as a whole. The signal value histogram is similar to that illustrated in FIG. 10. Furthermore, steps S1102 to S1106 are the same as steps S1702 to S1706 in FIG. 9, and thus those steps will not be described here.

In step S1107, it is determined whether each sub-region obtained from the division is saturated. In the saturation determination, a sub-region obtained from the dividing is determined to be saturated when there is a predetermined number or more of saturated pixels in the sub-region.

A method for dividing the one defocus computation region 1201 will be described here with reference to FIGS. 14A to 14C, FIG. 14A is a diagram illustrating the pixel unit in the focus detection sensor 101. The pixel unit is constituted by a plurality of square pixels, and is divided into the focus detection regions 301 to 306 described with reference to FIG. 4. Individual defocus computation regions 1201 and 1202 correspond to parts of focus detection regions CA 301 and CB 302, and are regions subjected to a known correlation computation.

FIG. 14B is a diagram excerpting the defocus computation region 1201, and illustrates sub-regions 1201a to 1201e having been formed by dividing the region into five parts in the direction orthogonal to the correlation direction. In the present embodiment, each of the sub-regions 1201a to 1201e is assumed to be constituted by the pixels of a single row. The same applies to the defocus computation region 1202. FIG. 14C is a diagram illustrating a situation where a saturated region 1203 is present in the sub-regions 1201b and 1201c, which are the second and third sub-regions from the top of the defocus computation region 1201. In this case, the saturation determination of step S1107 is performed for the second and third rows.

Returning to FIG. 13, in step S1108, it is determined whether or not all of the sub-regions 1201a to 1201e obtained from the division are saturated. The sequence moves to step S1109 if all of the sub-regions are saturated. However, if the sub-regions include a sub-region which is not saturated, the sequence moves to step S1110.

In step S1109, all of the sub-regions of the defocus computation region 1201 are used for the defocus computations performed in step S1111. In this case, although it has been determined that all of the sub-regions 1201a to 1201e are saturated, there are unsaturated pixels present in each of the sub-regions. As such, the defocus computations are performed using the unsaturated pixels. Additionally, if defocus computations are being performed on a plurality of focus detection regions aside from the defocus computation region 1201 as well, the saturated focus detection regions are set to be less likely to be selected for the defocus computations.

In step S1110, only the unsaturated sub-regions among the sub-regions 1201a to 1201e are used for the defocus computations in step S1111. Excluding the saturated regions from the defocus computations makes it possible to perform focus detection without being affected by saturated regions.

Note that known defocus computations are performed in step S1111, in the same manner as with step S1707 in the second embodiment.

Next, the calculation of the next accumulation time in step S608 in a situation where the defocus computations are performed having divided the one defocus computation region 1201 (1202) into a plurality of sub-regions will be described, focusing on the differences from the first embodiment.

The overall operations performed in step S608 are the same as in the first embodiment. A region for which the next accumulation time is to be controlled is determined on the basis of the result of determining which of the sub-regions 1201a to 1201e within the defocus computation region 1201 are saturated in step S1108. Regardless of the number of focus detection regions, the accumulation time is not controlled for saturated sub-regions. By controlling accumulation having excluded saturated sub-regions, the accumulation can be controlled without being affected by the subject background, even in situations where the background is backlit, a night scene, or the like.

Fourth Embodiment

Figure 15:
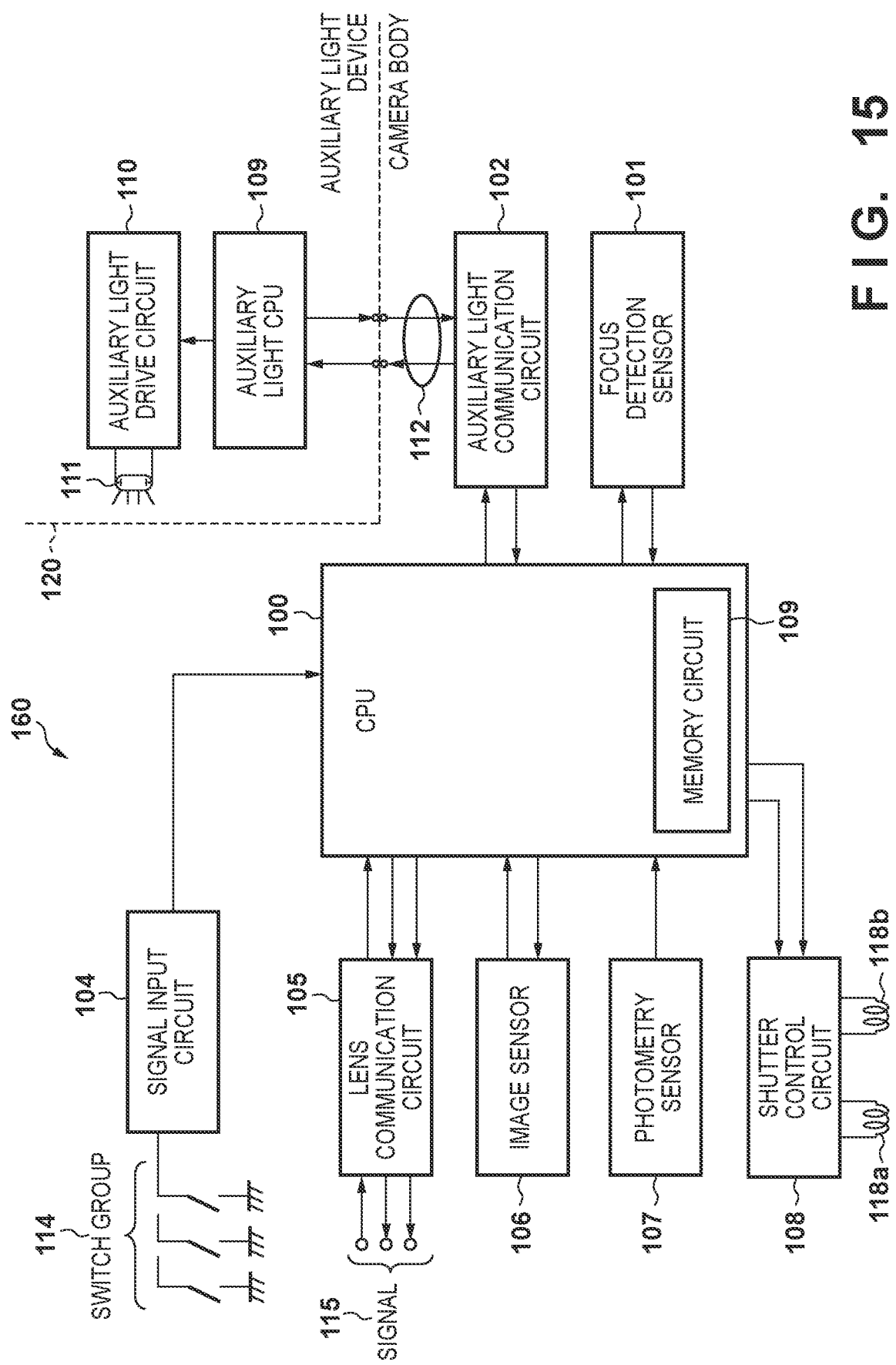
FIG. 15 is a block diagram illustrating the overall configuration of the camera body according to a fourth embodiment.

The configuration of tin image capturing apparatus according to a fourth embodiment is almost the same the configuration according to the first embodiment and illustrated in FIG. 1, except that an auxiliary light device 120 and an auxiliary light communication circuit 102 that communicates with the auxiliary light device 120 have been added to the configuration illustrated in FIG. 1, as illustrated in FIG. 15. The auxiliary light device 120 includes an auxiliary light CPU 109, an auxiliary light drive circuit 110, and a light source 111. The rest of the configuration is the same as that described in the first embodiment with reference to FIGS. 2 to 5, and will therefore not be described.

In FIG. 15, the CPU 100 transmits and receives signals 112 to and from the auxiliary light CPU 100 in the auxiliary light device 120 via the auxiliary light communication circuit 102. The auxiliary light CPU 100 illuminates a subject by driving the light source 111 using the auxiliary light drive circuit 110 in accordance with instructions from the CPU 100. A light source which continuously or intermittently emits light, such as an LED or a lamp, through the auxiliary light drive circuit 110, a light source which emits light using a xenon tube that also serves as a strobe device, or the like can be used as the light source 111. When emitting light using a xenon tube, it is typical to control the light emission in a flashing manner. As described above, auxiliary light devices having a variety of types of light sources are available, and a camera body 160 is configured so that such auxiliary light devices can be attached thereto.

Figure 16:
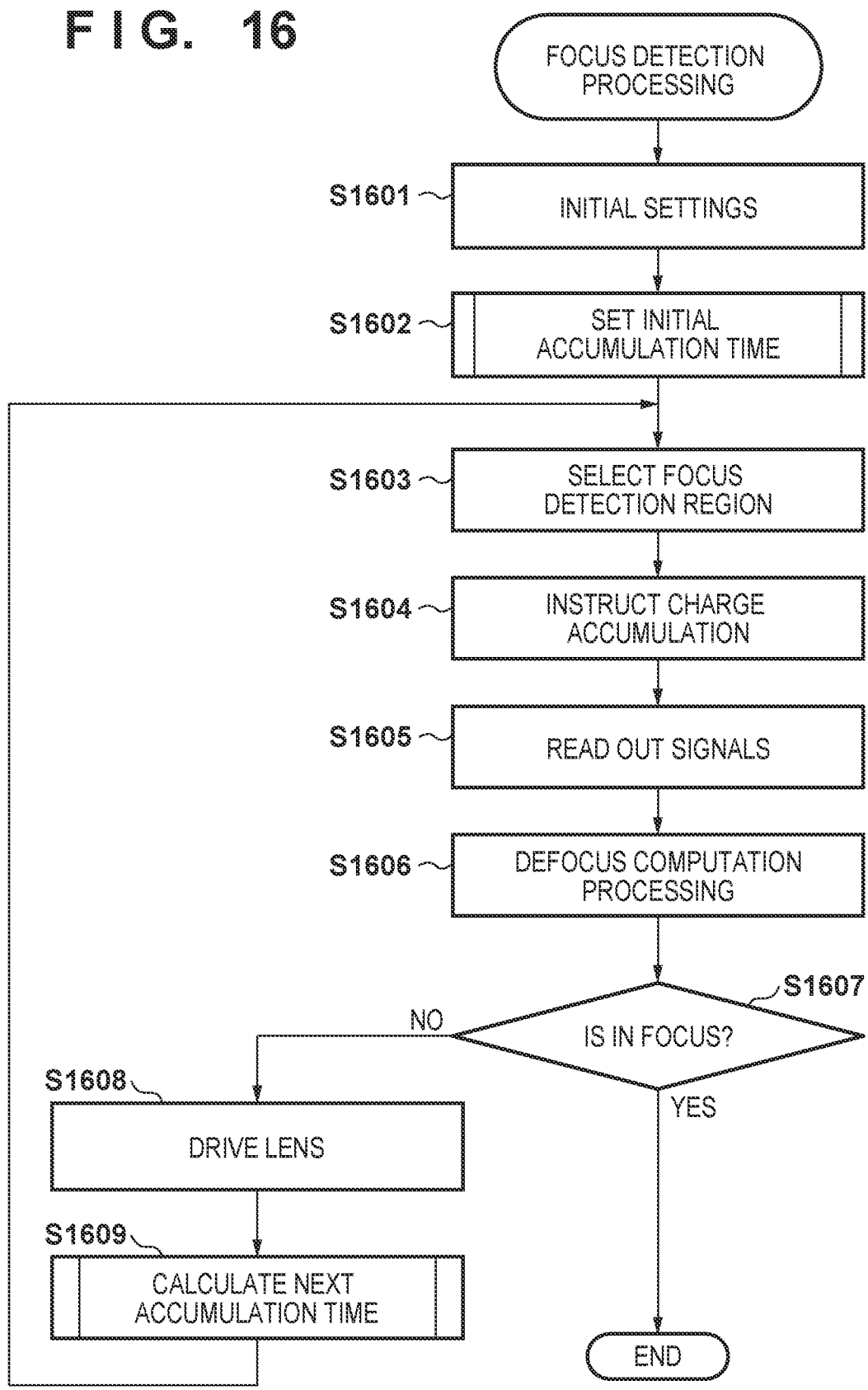
FIG. 16 is a flowchart illustrating focus detection processing according to the fourth embodiment.

FIG. 16 is a flowchart illustrating the flow of focus detection processing according to the present embodiment. When the CPU 100 receives a focus detection start signal in response to the switch group 114 being operated, the CPU 100 controls the focus detection sensor 101 to start the focus detection processing.

In step S1601, the CPU 100 makes initial settings for the focus detection processing. The CPU 100 writes the initial settings for the focus detection sensor 101 into a register. Then, one of the following modes is set for the focus detection regions: the discretionary selection mode, in which a given focus detection region selected by the user is used, and the automatic selection mode, in which a focus detection region selected by the CPU 100 automatically using a known algorithm is used.

The user can switch the auxiliary light device 120 on and off. When the auxiliary light device 120 is on, whether or not to emit light, the amount of light to emit, and so on are controlled in accordance with the subject luminance detected by the photometry sensor 107. The present embodiment will describe control performed in a state where the auxiliary light device 120 is off.

In step S1602, the CPU 100 sets an accumulation time for the initial accumulation by the focus detection sensor 101. The initial accumulation time is set to a fixed accumulation time determined in advance, or is set to an accumulation time based on the subject luminance detected by the photometry sensor 107.

In step S1603, the CPU 100 selects the focus detection region as described above. The present embodiment assumes that there is at least one focus detection region for each of the C region, the R region, and the L region. If a given focus detection region has been selected by the user in step S1601, the selected focus detection region is determined to be a focus detection region corresponding to a main subject region. On the other hand, if automatic selection by the CPU 100 is set, the CPU 100 selects the focus detection region automatically.

The following methods can be given as examples of selecting the focus detection region automatically. One method involves selecting the focus detection region where the focus position is closest to the near end, on the basis of a defocus amount calculated in step S1606 (described later). Another method involves selecting the focus detection region at a position where a main subject has been determined to be present, on the basis of the position of a face detected using the photometry sensor 107. During the first focus detection processing, when the defocus amount could not be detected in step S1606 (described later), and so on, the sequence may move to step S1604 without a focus detection region being selected.

In step S1604, the CPU 100 instructs the focus detection sensor 101 to start charge accumulation. Having receives the instruction to start charge accumulation, the focus detection sensor 101 performs circuit reset operations and photodiode reset operations, and then starts the charge accumulation operations on the basis of the accumulation time calculated in step S1602 or S1609. The charge accumulation operations then end after a predetermined amount of time has passed, and the accumulated charges are transferred to the memory units of the corresponding pixels.

In step S1605, the CPU 100 reads out the signals stored in the memory units, which were accumulated in step S1604.

In step S1606, the CPU 100 calculates a defocus amount for the image signals read out in step S1605. The defocus amount is calculated through known defocus computations which detect a focus state of the shooting lens 200 (a defocus amount) using a pair of image signals. Here, the defocus amount (mm) is found by multiplying a phase difference (number of bits) of the focus detection sensor 101 by a sensor pitch (mm) and an optical coefficient such as the baseline length of the focus detection system.

In step S1607, the CPU 100 determines whether or not the focus state of the shooting lens 200 is an in-focus state on the basis of the defocus amount calculated in step S1606. The lens is determined to be in the in-focus state when the defocus amount is within a desired range, e.g., within ¼ Fδ (where F is the aperture value of the lens and δ is a constant (20 μm)). For example, if the lens aperture value F is 2.0, the lens is determined to be in focus if the defocus amount is 10 μm or less, and the focus detection processing then ends. However, if the defocus amount is greater than 10 μm and it has been determined that the lens is not in focus, the sequence moves to step S1608 in order to bring the focus state of the shooting lens 200 to an in-focus position.

In step S1608, the CPU 100 makes a lens driving instruction to the shooting lens 200 via the lens communication circuit 105 on the basis of the defocus amount. In step S1609, the CPU 100 calculates and sets a value for the accumulation time of the focus detection sensor 101 in the next instance of the focus detection processing, in accordance with the subject luminance. Processing for calculating the next accumulation time will be described later with reference to the flowchart in FIG. 17. The CPU 100 then returns the sequence to step S1603 and repeats the operations of steps S1603 to S1609 until it is determined that the lens is in the in-focus state. The foregoing is the flow of the focus detection processing.

Figure 17:
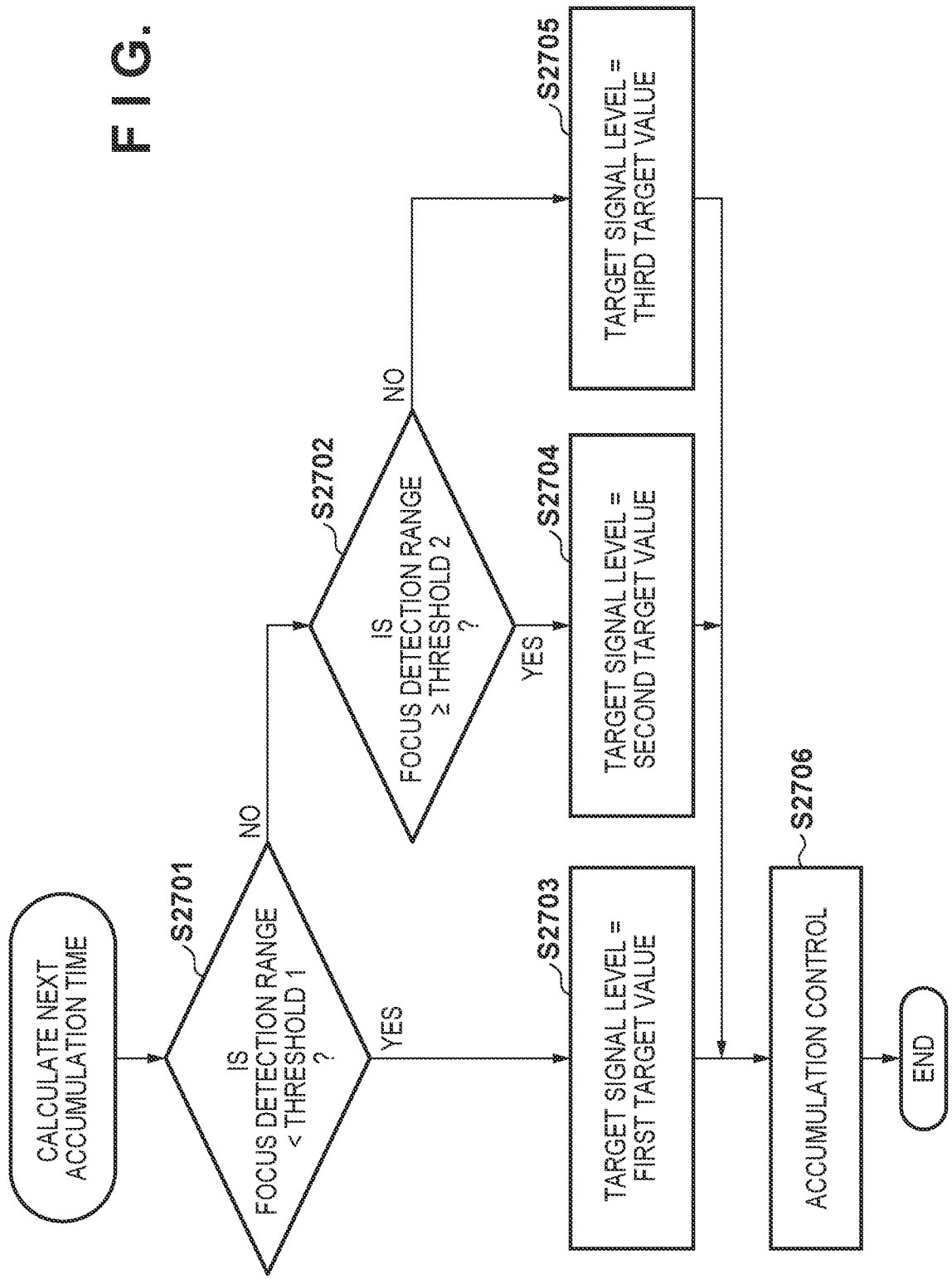
FIG. 17 is a flowchart illustrating operations for determining an accumulation time according to the fourth embodiment.

FIG. 17 is a flowchart illustrating processing for calculating the next accumulation time, carried out in step S1609 illustrated in FIG. 16.

In step S2701, the CPU 100 determines whether or not the focus detection range selected by the user is less than a threshold 1. Here, the size of the threshold 1 is assumed to be a range which makes it possible to determine whether the user has selected only one focus detection region or a plurality of focus detection regions. The sequence moves to step S2703 if the focus detection range is less than the threshold 1, and to step S2702 if the focus detection range is greater than or equal to the threshold 1 (greater than or equal to the threshold).

In step S2702, the CPU 100 determines whether or not the focus detection range selected by the user is greater than or equal to a threshold 2. Here, the size of the threshold 2 is assumed to be a range which makes it possible to determine whether all regions are being used, or only predetermined regions selected by the user. The sequence moves to step S2704 if the focus detection range is greater than or equal to the threshold 2, and to step S2705 if the focus detection range is less than the threshold 2.

In step S2703, the CPU 100 sets, as a first target value, a target value for a differential signal ("PB signal" hereinafter) between Peak and Bottom, which are the highest and lowest signal values among the image signals within the focus detection range. The first target value is a signal value which enables focus detection with the PB signal within the focus detection range.

The signal value for the PB signal which enables focus detection is set to a value at which variation in the defocus amount falls within a desired range. As one example, the signal value is set to be within ¼ Fδ, which is the desired range set in the above-described step S1607.

In step S2704, the CPU 100 sets the target value for the PB signal within the focus detection range to a second target value. The second target value is a higher value than the first target value. Meanwhile, the upper limit of the Peak signal is the amount of charge which can be accumulated in the photodiode units of the focus detection sensor 101, or in the memory units to which the charges accumulated in the photodiode units are transferred ("D range" hereinafter). Therefore, it is desirable that the second target value be set to a signal value such that the Peak signal is near the upper limit of the D range.

In step S2705, the CPU 100 sets the target value for the PB signal within the focus detection range to a third target value. The third target value is set to a signal value between the first target value and the second target value. Compared to step S2704, the focus detection range is narrower and it is likely that the same subject is being detected, and it is therefore thought that any luminance differences within the subject will be small. The third target value can therefore be set lower than the second target value. A method in which the third target value is linearly interpolated from the first target value and the second target value in accordance with the focus detection range can be given as an example of a method for setting the third target value. Accordingly, the magnitude relationships among the target values is the first target value<the third target value<the second target value.

Figure 18A:
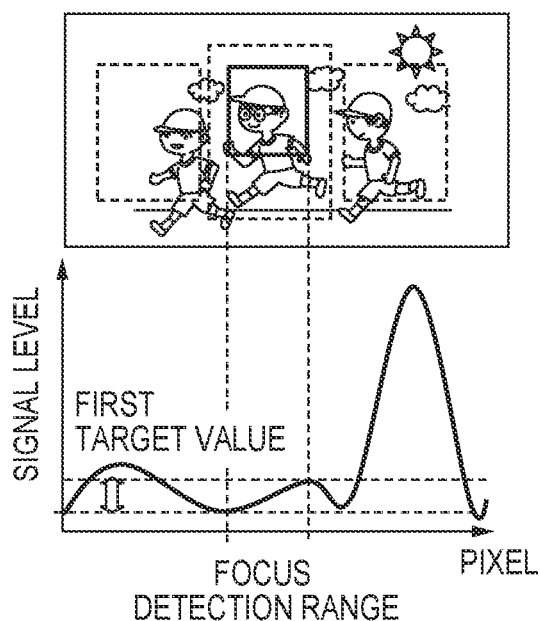
FIGS. 18A to 18C are diagrams illustrating a relationship between a focus detection range and a target signal level according to the fourth embodiment.
Figure 18B:
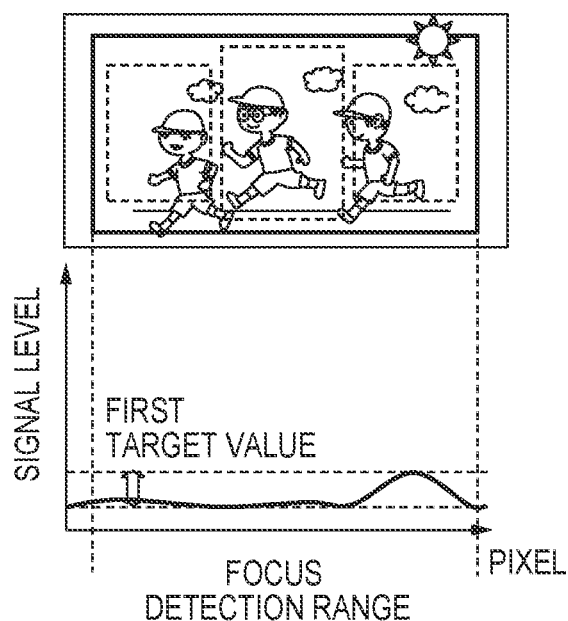
Figure 18C:
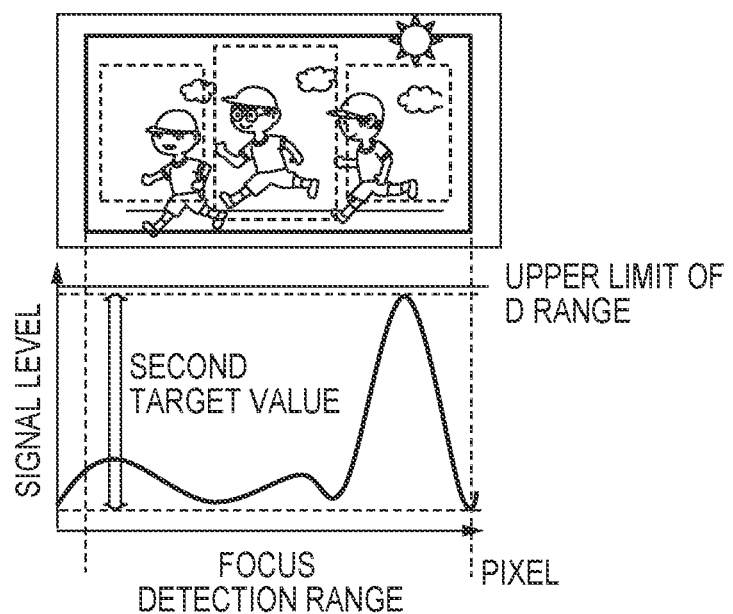

Next, FIGS. 18A to 18C are diagrams illustrating a relationship between the focus detection range and a target signal value. FIG. 18A is a diagram illustrating the relationship between the focus detection range and the image signal for a subject when the target signal value has been set to the first target value in step S2703. Regions aside from those surrounded by the thin dotted lines are the regions where light does not enter due to the optical system described in FIG. 3.

Because the focus detection range in FIG. 18A is a region that includes a subject selected by the user, it is acceptable to accumulate a signal level which enables focus detection for the selected subject. Meanwhile, setting the target value higher and increasing the signal level to be accumulated lengthens the time required for accumulation, which worsens the responsiveness. Thus in the focus detection range illustrated in FIG. 18A, the first target value is set to the minimum signal value at which focus detection is possible.

FIG. 18B is a diagram illustrating the relationship between the focus detection range and the image signal for a subject when the focus detection range has been set to all regions and the target signal value has been set to the first target value. If the maximum PB signal in all regions is set to the first target value, subjects aside from those corresponding to the maximum PB signal will have blocked-out shadows, and thus focus detection cannot be performed on those subjects.

When the focus detection range is set to all regions, it is desirable that the focus detection region be selected using the algorithm described earlier in step S1603 of FIG. 16 after first performing focus detection for all of the subjects. However, if the target signal value is set to the first target value, only the focus detection region corresponding to the maximum signal value can be selected, which results in the focus detection being affected by point light sources in the background and the like. Accordingly, when the focus detection range is set to all regions, the target signal value is set to the second target value as described in step S2704.

FIG. 18C is a diagram illustrating the relationship between the focus detection range and the image signal for a subject when the target signal value has been set to the second target value in step S2704. Setting the target value for the target signal value to the second target value, which is higher than the first target value, makes it less likely for blocked-out shadows to arise in all subjects, and thus the focus detection region can be selected using the algorithm described earlier in step S1603 of FIG. 16.

Although the foregoing has described a method for setting the target value on the basis of the PB signal, the target value may be set on the basis of the Peak signal.

Returning to the flowchart in FIG. 17, in step S2706, the CPU 100 sets the accumulation time, or the gain calculation and setting, so that the PB signal in the next instance of accumulation matches the target value found in step S2703, S2704, or S2705.

As described thus far, changing the target value for the accumulated signal level in accordance with the focus detection range makes it possible to perform focus detection processing which provides both responsiveness and accurate focus detection.

Fifth Embodiment

The foregoing fourth embodiment described control performed in a state where the auxiliary light device 120 illustrated in FIG. 15 is turned off. A fifth embodiment will describe control performed in a state where the auxiliary light device 120 is turned on. The configuration of the camera body 160 and the focus detection processing according to the present embodiment are the same as those of the fourth embodiment and will therefore not be described here.

The present embodiment assumes that the user has set the auxiliary light device 120 to "on" in step S1601 of FIG. 16.

A known accumulation control method which is based on a subject luminance determined from ambient light illuminating the subject, an illumination light amount, a distance from the subject, a subject reflectance, and so on can be given as an example of accumulation control using the auxiliary light device. However, the distance to the subject is unknown at the initial light emission and when accumulation is performed, and thus the subject luminance cannot be detected by the photometry sensor 107 beforehand. Initial accumulation control settings using the auxiliary light device 120 will be described with reference to FIG. 19.

FIG. 19 is a flowchart pertaining to initial accumulation time settings for the focus detection sensor 101 according to the present embodiment.

In step S1901, the CPU 100 determines whether or not the focus detection range selected by the user is less than a threshold 1. Here, the size of the threshold 1 is assumed to be a range which makes it possible to determine whether the user has selected only one focus detection region or a plurality of focus detection regions. The sequence moves to step S1903 if the focus detection range is less than the threshold 1, and to step S1902 if the focus detection range is greater than or equal to the threshold 1.

In step S1902, the CPU 100 determines whether or not the focus detection range selected by the user is greater than or equal to a threshold 2. Here, the size of the threshold 2 is assumed to be a range which makes it possible to determine whether all regions are being used, or only predetermined regions selected by the user. The sequence moves to step S1904 if the focus detection range is greater than or equal to the threshold 2, and to step S1905 if the focus detection range is less than the threshold 2.

In step S1903, the CPU 100 sets the initial accumulation time to t1. t1 is an accumulation time at which an appropriate signal level is achieved when shooting an image of a person, which is a scene often shot using auxiliary light. As one example, the accumulation time is calculated with a subject distance of 50·f (where f is the focal length) for a bust shot of the subject, and with a reflectance of 18%, which is a typical reflectance for human skin.

In step S1904, the CPU 100 sets the initial accumulation time to t2, which is longer than t1. As the focus detection range broadens, there is an increased likelihood that the subject will be present further from the position of the bust shot within the focus detection range, or that the reflectance of the subject will be lower than the typical reflectance of human skin. As such, to avoid a situation where the subject has blocked-out shadows and focus detection cannot be performed, the accumulation time t2 is set to be longer than t1, which makes it possible to perform focus detection for all subjects within the region.

In step S1905, the CPU 100 sets the initial accumulation time to t3, which is between t1 and t2. As such, the magnitude relationship among the accumulation times is t1<t3<t2. A method such as linearly interpolating t3 from t1 and t2 in accordance with the size of the focus detection range can be given as an example of a method for setting t3.

Although the foregoing describes a method of changing the initial accumulation time of the focus detection sensor in accordance with the focus detection range, the gain may be changed in addition to the accumulation time.

As described thus far, changing the initial accumulation time or the gain in accordance with the focus detection range when using an auxiliary light device for illumination makes it possible to perform focus detection processing which provides both responsiveness and accurate focus detection.

Sixth Embodiment

The configuration of an image capturing apparatus according to a sixth embodiment are the same as those described in the first embodiment with reference to FIGS. 1 to 2, and will therefore not be described. The present embodiment will describe a situation where instead of using the focus detection sensor 101 described with reference to FIG. 3, the focus detection processing is performed using the image sensor 106 as a sensor which outputs at least one of an image signal for display and an image signal for recording, and outputs (can output) an image signal for focus detection.

Figure 20:
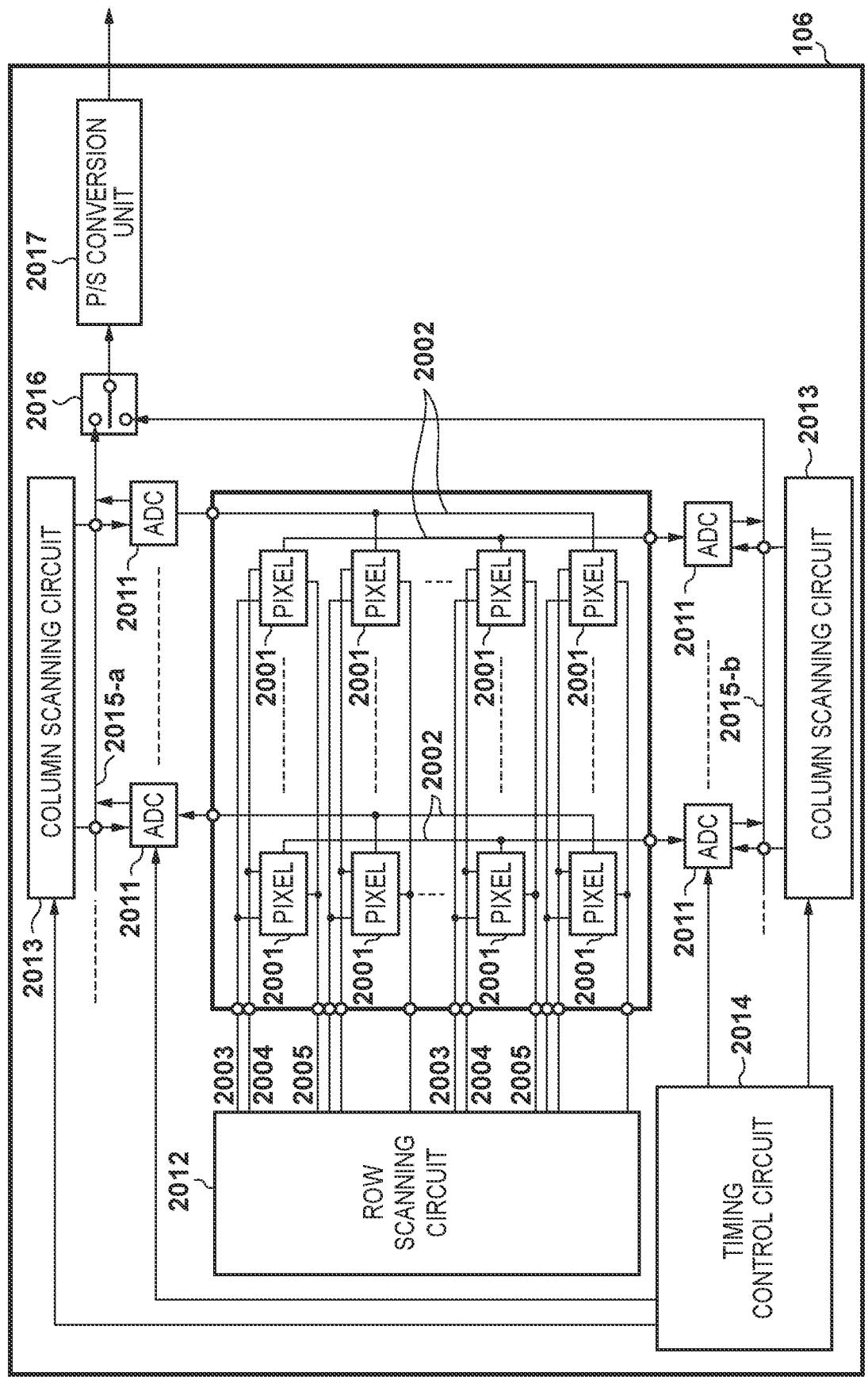
FIG. 20 is an overall block diagram illustrating an example of the configuration of an image sensor according to a sixth embodiment.

The configuration of the image sensor 106 will be described with reference to FIG. 20. The image sensor 106 has a configuration in which many pixel units 2001 are disposed in a two-dimensional array. A vertical output line 2002, a transfer signal line 2003, a reset signal line 2004, and a row selection signal line 2005 are connected to each of the pixel units 2001. A column ADC block 2011 outputs a signal obtained through analog/digital (A/D) conversion performed on a signal output from the vertical output line 2002 connected to the corresponding pixel unit 2001. A row scanning circuit 2012 is connected to each pixel unit 2001 by the corresponding transfer signal line 2003, reset signal line 2004, and row selection signal line 2005. A plurality of column scanning circuits 2013 are connected to the plurality of column ADC blocks 2011 by horizontal signal lines 2015-a and 2015-b. A timing control circuit 2014 performs control by outputting timing control signals to the column ADC blocks 2011 and the column scanning circuits 2013.

A switching unit 2016 switches between the signals from the horizontal signal lines 2015-a and 2015-b, and outputs the signal to a parallel-serial conversion unit (called a "P/S conversion unit" hereinafter) 2017. The P/S conversion unit 2017 obtains the output from the switching unit 2016 and performs parallel-serial conversion thereon. The P/S conversion unit 2017 outputs the post-conversion signal to the exterior.

In the image sensor 106 according to the present embodiment, each of the pixel units 2001 is connected to the corresponding transfer signal line 2003, reset signal line 2004, and row selection signal line 2005 in the horizontal direction (the row direction), and to the vertical output line 2002 in the vertical direction (the column direction). Each vertical output line 2002 is connected to a different destination according to the units in which rows are read out. A signal read out from the pixel unit 2001 is output to the horizontal signal line 2015-a and the horizontal signal line 2015-b on a channel-by-channel basis via the column ADC block 2011, and is sent to the switching unit 2016. The image signal selected by the switching unit 2016 is subjected to parallel-serial conversion by the P/S conversion unit 2017 in accordance with the timing from the timing control circuit 2014, and is then output to the exterior of the image sensor 106.

A method of reading out all the pixels, a method of thinning the pixels in the vertical direction and then reading out the pixels, a method of adding the pixels in the horizontal direction and then reading out the pixels, a vertically-thinned/horizontally-added method, and so on can be selected as appropriate as the method for reading out the pixel signals. The vertically-thinned/horizontally-added method is a readout method in which the pixels are read out having been thinned in the vertical direction and added in the horizontal direction. The present embodiment employs a method of reading out all the pixels as a still image readout method. In a first readout mode, the pixel signals are read out from all the pixel units of the image sensor, as pixel units of a first number of pixels. Because there is a high number of pixels to be read out, and only a limited number of images can be obtained in a predetermined amount of time, it is difficult to accurately keep a subject in the angle of view when the subject is a moving object moving at a high speed. Meanwhile, the vertically-thinned/horizontally-added method is employed as a live-view readout method. In a second readout mode, the pixel signals are read out from the pixel units of a second number of pixels, which is lower than the first number of pixels. Because the number of pixels to be read out is lower, this mode is suitable for speeding up the processing.

Figure 21:
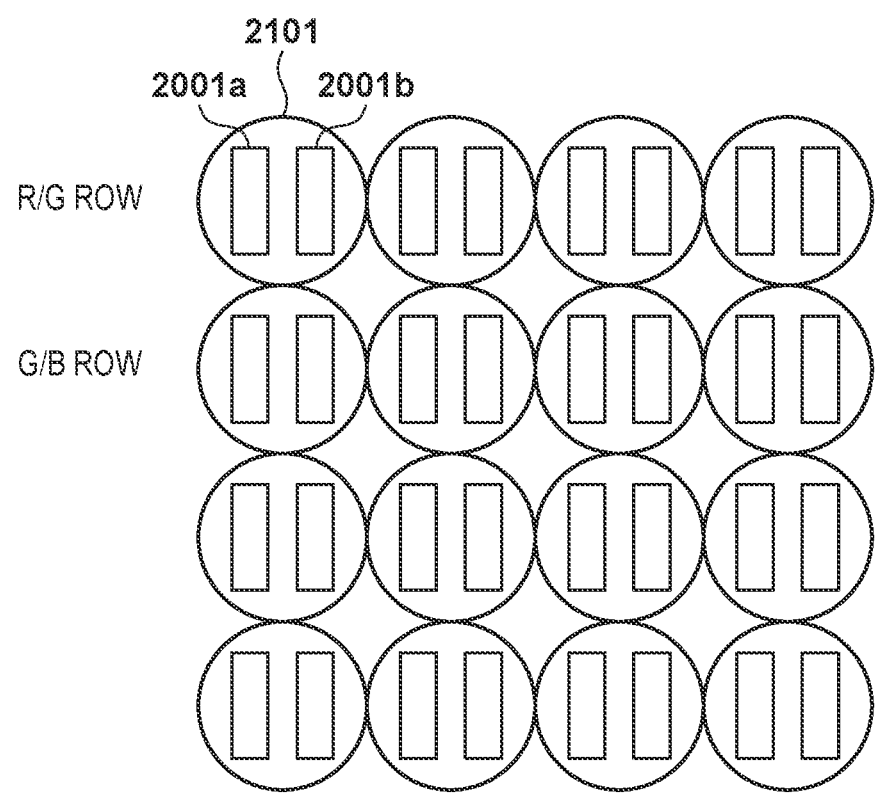
FIG. 21 is a diagram illustrating the arrangement of pixels in the image sensor according to the sixth embodiment.

FIG. 21 schematically illustrates the pixel arrangement in the image sensor 106, which is used in image plane-based phase difference AF in the present embodiment. The image sensor 106 has a configuration in which a plurality of photoelectric conversion units are arranged corresponding to on-chip microlenses 2101. A Bayer pattern is applied to color filters, with the pixels in odd-numbered rows indicated by R and G being provided with red (RED) and green (GREEN) color filters in an alternating manner in order from the left. The pixels in even-numbered rows indicated by G and B are provided with green (GREEN) and blue (BLUE) color filters in an alternating manner in order from the left. The on-chip microlenses 2101 are formed on the color filters. The plurality of photoelectric conversion units arranged within the on-chip microlenses 2101 are indicated by a corresponding plurality of rectangles. Photoelectric conversion units forming pairs in the pupil division-type image sensor are indicated as A pixels 2001a and B pixels 2001b. An A image, which is a first viewpoint image, is generated by image signals output from the A pixels 2001a included in a first pixel group. A B image, which is a second viewpoint image, is generated by image signals output from the B pixels 2001b included in a second pixel group. A computing unit detects a relative image shift amount between the A image and the B image through a correlation computation, and calculates a defocus amount in a predetermined region. A focus lens is moved on the basis of the defocus amount, and focus adjustment operations are performed by a lens unit 301. Additionally, processing for adding the A image signals and the B image signals within the image sensor is performed to generate image signals for display and for recording. Note that the light-receiving surfaces of the photoelectric conversion units may be partially blocked, rather than employing the pixel configuration in which a plurality of photoelectric conversion units are provided as illustrated in FIG. 21.

With respect to the flowcharts of FIGS. 6 and 7 illustrating the focus detection processing, the focus detection sensor 101 of the first embodiment is replaced with the image sensor 106, but the flow of the processing is the same and will therefore not be described here.

Note that the image sensor 106 handles both focus detection and live view display, and thus when the target value is increased in step S706 of FIG. 7, it is necessary to perform control so that the live view display does not fluctuate greatly for the user.

For example, increasing the signal level by applying digital gain only to signal levels used in the focus detection processing ensures that the live view display will not fluctuate greatly for the user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-183281, filed Oct. 3, 2019, and Japanese Patent Application No. 2020-117326, filed Jul. 7, 2020, which are hereby incorporated by reference herein in their entirety.

What is claimed is:

1. An image capturing apparatus capable of focus detection, the apparatus comprising:
    a sensor including a plurality of pixels, the sensor being capable of changing an accumulation time of the pixels for each of a plurality of regions including the plurality of pixels; and
    at least one processor or circuit configured to function as:
    an accumulation control unit that, in accordance with a state or a setting of the image capturing apparatus, changes accumulation control of the pixels for each of the plurality of regions; and
    a defocus computation unit that calculates a defocus amount using signals from the pixels for which accumulation has been controlled by the accumulation control unit,
    wherein of the plurality of regions, the accumulation control unit changes the accumulation control of the pixels in a first region, in which defocus computations are performed only in one direction, and in a second region, in which defocus computations are performed in a plurality of directions.

2. The image capturing apparatus according to claim 1, wherein when, in the second region, a difference between peak values of image signals in each direction in which the defocus computations are performed is lower than a first threshold, the accumulation control unit controls accumulation for the pixels on the basis of the peak value which is higher among the peak values of pixel signals in each direction in which the defocus computations are performed.

3. The image capturing apparatus according to claim 1, wherein when, in the second region, a difference between peak values of image signals in each direction in which the defocus computations are performed is greater than a second threshold, the second threshold being higher than the first threshold, the accumulation control unit controls accumulation for the pixels on the basis of the peak value which is lower among the peak values of pixel signals in each direction in which the defocus computations are performed.

4. The image capturing apparatus according to claim 1, wherein when, in the second region, a difference between peak values of image signals in each direction in which the defocus computations are performed is a value between a first threshold and a second threshold which is greater than the first threshold, the accumulation control unit controls accumulation for the pixels on the basis of an average of the peak value which is lower and the peak value which is higher among the peak values of pixel signals in each direction in which the defocus computations are performed.

5. The image capturing apparatus according to claim 1, wherein in the first region, the accumulation control unit controls accumulation for the pixels on the basis of a peak value of pixel signals in one direction in which the defocus computations are performed.

6. The image capturing apparatus according to claim 1, wherein the sensor is an image sensor capable of outputting at least an image signal for display and an image signal for recording, and an image signal for focus detection.

7. The image capturing apparatus according to claim 1, wherein the sensor is a sensor configured to be capable of global electronic shutter operations.

8. The image capturing apparatus according to claim 1, wherein the sensor is a focus detection sensor that photoelectrically converts an image formed through a secondary image forming lens and outputs a signal obtained from the photoelectric conversion.

9. An image capturing apparatus capable of focus detection, the apparatus comprising:
a sensor including a plurality of pixels, the sensor being capable of changing an accumulation time of the pixels for each of a plurality of regions including the plurality of pixels; and
at least one processor or circuit configured to function as:
an accumulation control unit that, in accordance with a state or a setting of the image capturing apparatus, changes accumulation control of the pixels for each of the plurality of regions; and
a defocus computation unit that calculates a defocus amount using signals from the pixels for which accumulation has been controlled by the accumulation control unit,
wherein in accordance with the state or the setting of the image capturing apparatus, the accumulation control unit switches between first accumulation control, in which the accumulation of the pixels is controlled primarily in a main region, and second accumulation control, in which the accumulation of the pixels is controlled on the basis of signals from a region that is broader than the main region.

10. The image capturing apparatus according to claim 9, wherein the accumulation control unit performs the second accumulation control when the image capturing apparatus is not in focus.

11. The image capturing apparatus according to claim 9, wherein the accumulation control unit performs the second accumulation control in a first instance of the accumulation control after the sensor has been activated.

12. The image capturing apparatus according to claim 9, wherein the accumulation control unit changes a range of signals used in the second accumulation control in accordance with a size of a selected region.

13. The image capturing apparatus according to claim 9, wherein the accumulation control unit adjusts a signal level by multiplying a gain based on an accumulated signal level after the first accumulation control and the second accumulation control.

14. The image capturing apparatus according to claim 9, wherein when defocus computations are performed having divided a single region into a plurality of regions, the defocus computation unit determines a saturation of each of the regions obtained from the division, and performs the defocus computations using only regions that are not saturated.

15. The image capturing apparatus according to claim 9, wherein when defocus computations are performed having divided a single region into a plurality of regions, the defocus computation unit determines a saturation of each of the regions obtained from the division, and if all of the regions are saturated, the defocus computation unit performs the defocus computations using all of the regions.

16. An image capturing apparatus capable of focus detection, the apparatus comprising: a sensor including a plurality of pixels, the sensor being capable of changing an accumulation time of the pixels for each of a plurality of regions including the plurality of pixels; and at least one processor or circuit configured to function as: an accumulation control unit that, in accordance with a state or a setting of the image capturing apparatus, changes accumulation control of the pixels for each of the plurality of regions; and a defocus computation unit that calculates a defocus amount using signals from the pixels for which accumulation has been controlled by the accumulation control unit, wherein the accumulation control unit changes the accumulation control of the pixels for each of the plurality of regions in accordance with a broadness of the selected region, wherein when the region is smaller than a first threshold, the accumulation control unit controls an accumulated signal level to a first signal level, and when the region is greater than or equal to the first threshold, the accumulation control unit controls the signal level of the pixels to a second signal level greater than the first signal level.

17. The image capturing apparatus according to claim 16, wherein the first signal level is a signal level at which a contrast calculated from a difference between a maximum value and a minimum value of a signal of the pixels is greater than a predetermined value.

18. The image capturing apparatus according to claim 16, wherein the second signal level is a value near an upper limit of a dynamic range of the sensor.

19. The image capturing apparatus according to claim 16, wherein the accumulation control unit sets the accumulated signal level to between the first signal level and the second signal level in accordance with the broadness of the region.

20. The image capturing apparatus according to claim 16, further comprising:
an auxiliary light device that illuminates a subject,
wherein the accumulation control unit changes an initial accumulation time of the sensor in a case where the auxiliary light device is used, in accordance with the broadness of the region.

21. A method of controlling an image capturing apparatus, the image capturing apparatus comprising a sensor that includes a plurality of pixels and that can change an accumulation time of the pixels for each of a plurality of regions including the plurality of pixels, and the method comprising:

changing, in accordance with a state or a setting of the image capturing apparatus, accumulation control of the pixels for each of the plurality of regions; and calculating a defocus amount using signals from the pixels for which accumulation has been controlled in the accumulation control, wherein in the changing, of the plurality of regions, the accumulation control of the pixels in a first region, in which defocus computations are performed only in one direction, and in a second region, in which defocus computations are performed in a plurality of directions is changed.

22. A non-transitory computer-readable storage medium in which is stored a program for causing a computer to execute each step of a method of controlling an image capturing apparatus, the image capturing apparatus comprising a sensor that includes a plurality of pixels and that can change an accumulation time of the pixels for each of a plurality of regions including the plurality of pixels, and the method comprising:

changing, in accordance with a state or a setting of the image capturing apparatus, accumulation control of the pixels for each of the plurality of regions; and calculating a defocus amount using signals from the pixels for which accumulation has been controlled in the accumulation control, wherein in the changing, of the plurality of regions, the accumulation control of the pixels in a first region, in which defocus computations are performed only in one direction, and in a second region, in which defocus computations are performed in a plurality of directions is changed.

23. A method of controlling an image capturing apparatus, the image capturing apparatus comprising a sensor that includes a plurality of pixels and that can change an accumulation time of the pixels for each of a plurality of regions including the plurality of pixels, and the method comprising:

changing, in accordance with a state or a setting of the image capturing apparatus, accumulation control of the pixels for each of the plurality of regions; and calculating a defocus amount using signals from the pixels for which accumulation has been controlled in the accumulation control, wherein in accordance with the state or the setting of the image capturing apparatus, the accumulation control is switched between first accumulation control, in which the accumulation of the pixels is controlled primarily in a main region, and second accumulation control, in which the accumulation of the pixels is controlled on the basis of signals from a region that is broader than the main region.

24. A non-transitory computer-readable storage medium in which is stored a program for causing a computer to execute each step of a method of controlling an image capturing apparatus, the image capturing apparatus comprising a sensor that includes a plurality of pixels and that can change an accumulation time of the pixels for each of a plurality of regions including the plurality of pixels, and the method comprising:

changing, in accordance with a state or a setting of the image capturing apparatus, accumulation control of the pixels for each of the plurality of regions; and calculating a defocus amount using signals from the pixels for which accumulation has been controlled in the accumulation control, wherein in accordance with the state or the setting of the image capturing apparatus, the accumulation control is switched between first accumulation control, in which the accumulation of the pixels is controlled primarily in a main region, and second accumulation control, in which the accumulation of the pixels is controlled on the basis of signals from a region that is broader than the main region.

25. A method of controlling an image capturing apparatus, the image capturing apparatus comprising a sensor that includes a plurality of pixels and that can change an accumulation time of the pixels for each of a plurality of regions including the plurality of pixels, and the method comprising: changing, in accordance with a state or a setting of the image capturing apparatus, accumulation control of the pixels for each of the plurality of regions; and calculating a defocus amount using signals from the pixels for which accumulation has been controlled in the accumulation control, wherein the accumulation control of the pixels for each of the plurality of regions is changed in accordance with a broadness of the selected region, wherein when the region is smaller than a first threshold, the accumulation control controls an accumulated signal level to a first signal level, and when the region is greater than or equal to the first threshold, the accumulation control controls the signal level of the pixels to a second signal level greater than the first signal level.

26. A non-transitory computer-readable storage medium in which is stored a program for causing a computer to execute each step of a method of controlling an image capturing apparatus, the image capturing apparatus comprising a sensor that includes a plurality of pixels and that can change an accumulation time of the pixels for each of a plurality of regions including the plurality of pixels, and the method comprising: changing, in accordance with a state or a setting of the image capturing apparatus, accumulation control of the pixels for each of the plurality of regions; and calculating a defocus amount using signals from the pixels for which accumulation has been controlled in the accumulation control, wherein the accumulation control of the pixels for each of the plurality of regions is changed in accordance with a broadness of the selected region, wherein when the region is smaller than a first threshold, the accumulation control unit controls an accumulated signal level to a first signal level, and when the region is greater than or equal to the first threshold, the accumulation control unit controls the signal level of the pixels to a second signal level greater than the first signal level.

* * * * *